Figure 1:
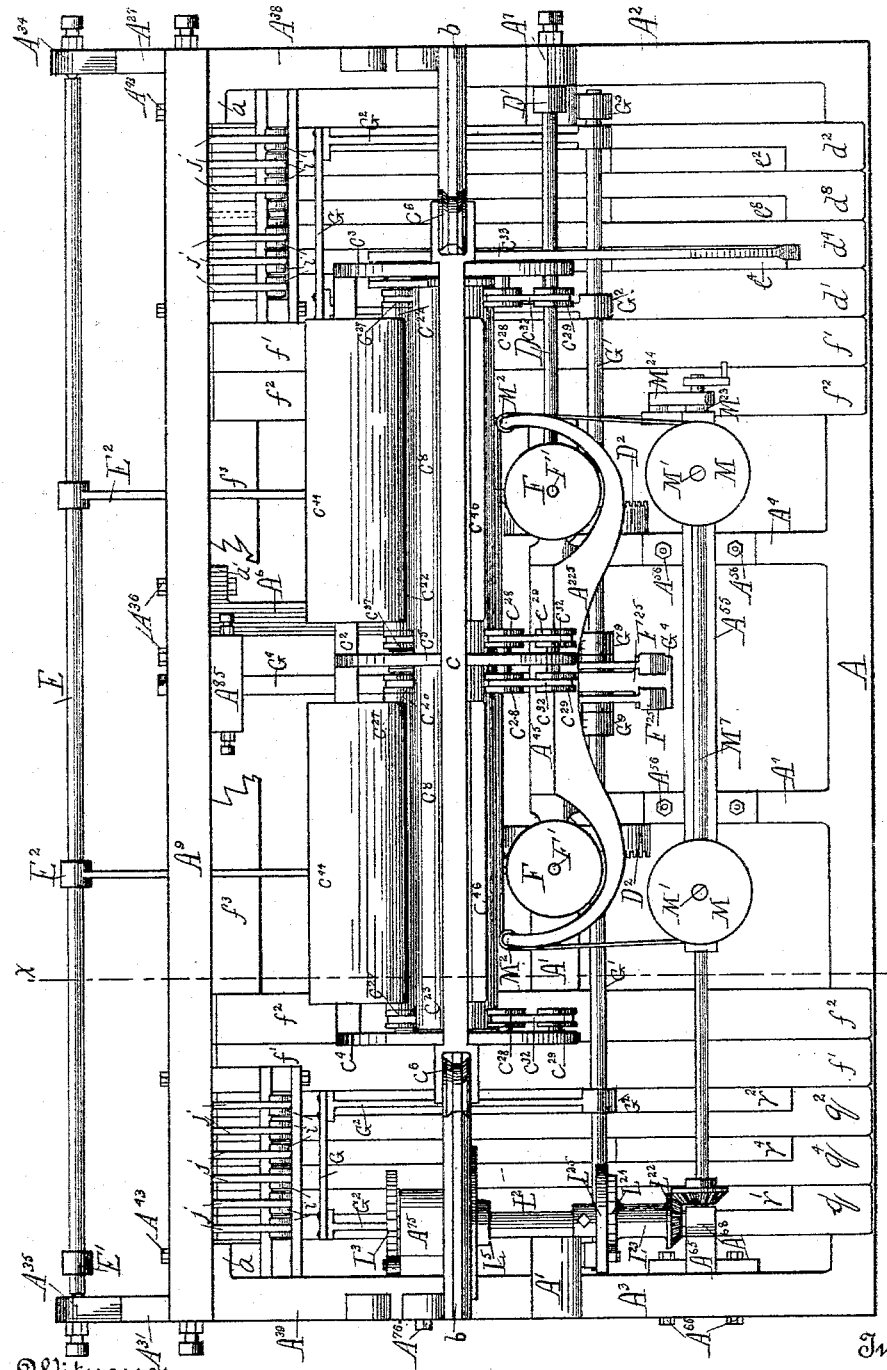

(No Model.)  17 Sheets—Sheet 1.

T. CAHILL.
TYPE WRITING MACHINE.

No. 531,904. Patented Jan. 1, 1895.

Witnesses
E. A. Short.
M. H. Cahill.

Inventor
Thaddeus Cahill.

(No Model.)  17 Sheets—Sheet 4.

T. CAHILL.
TYPE WRITING MACHINE.

No. 531,904. Patented Jan. 1, 1895.

Witnesses
E. A. Short.
M. H. Cahill.

Inventor
Thaddeus Cahill.

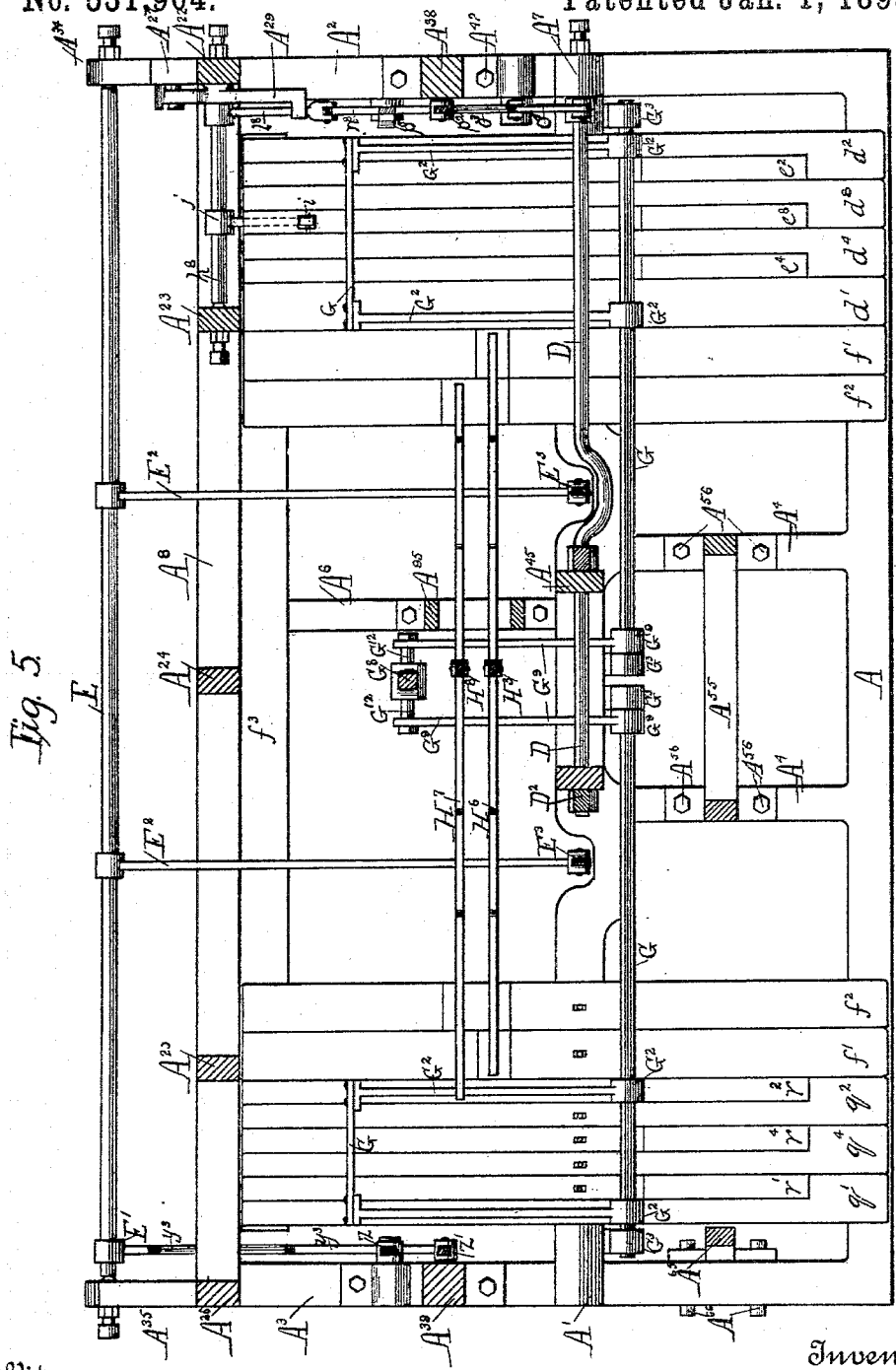

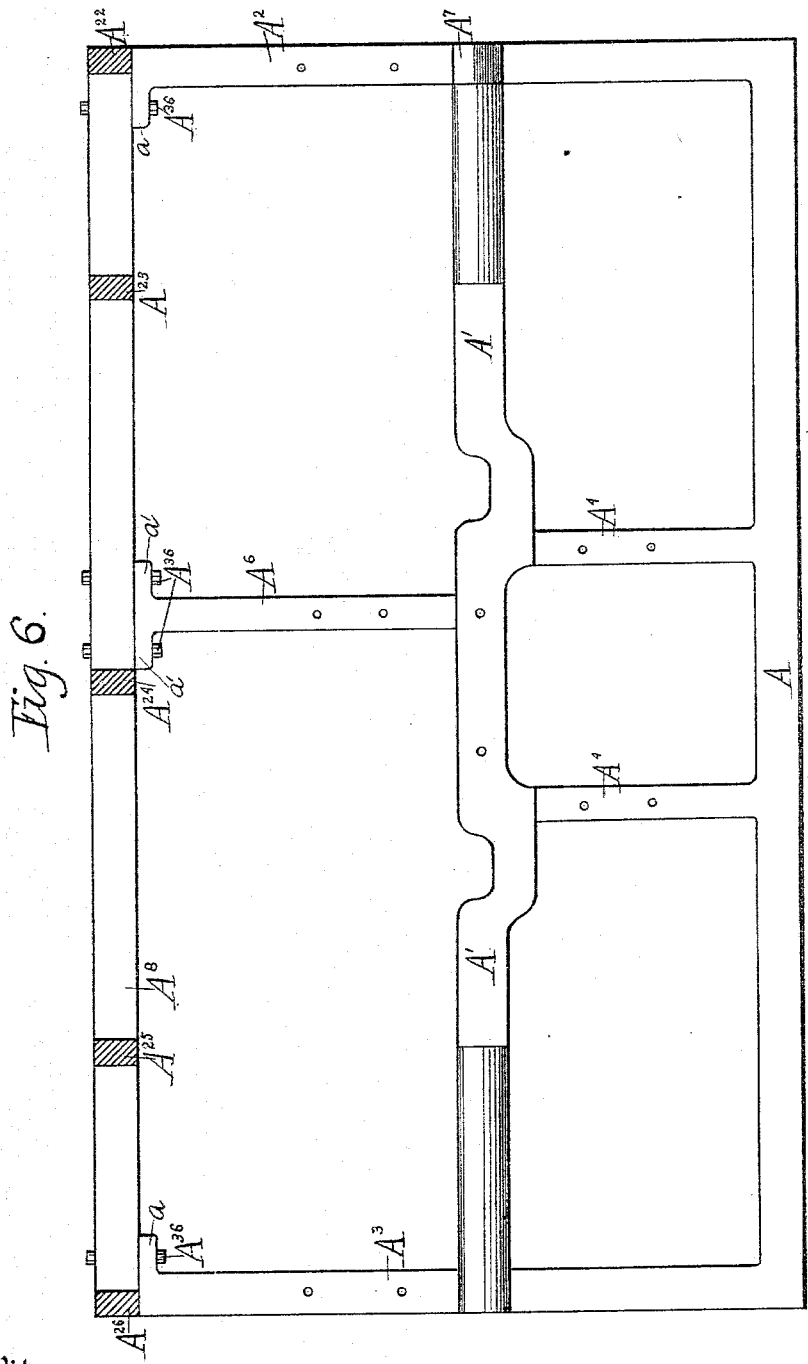

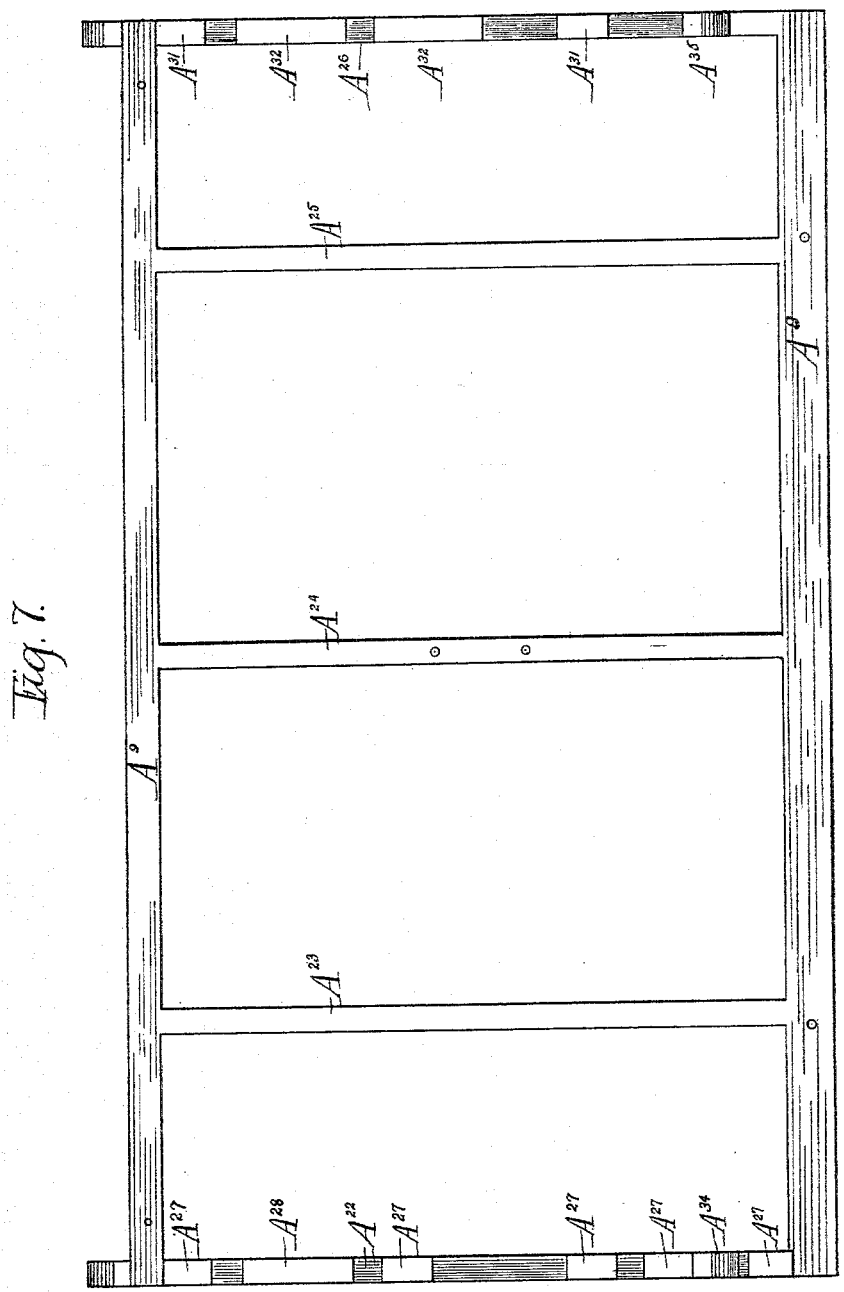

(No Model.)  17 Sheets—Sheet 8.
T. CAHILL.
TYPE WRITING MACHINE.
No. 531,904.  Patented Jan. 1, 1895.
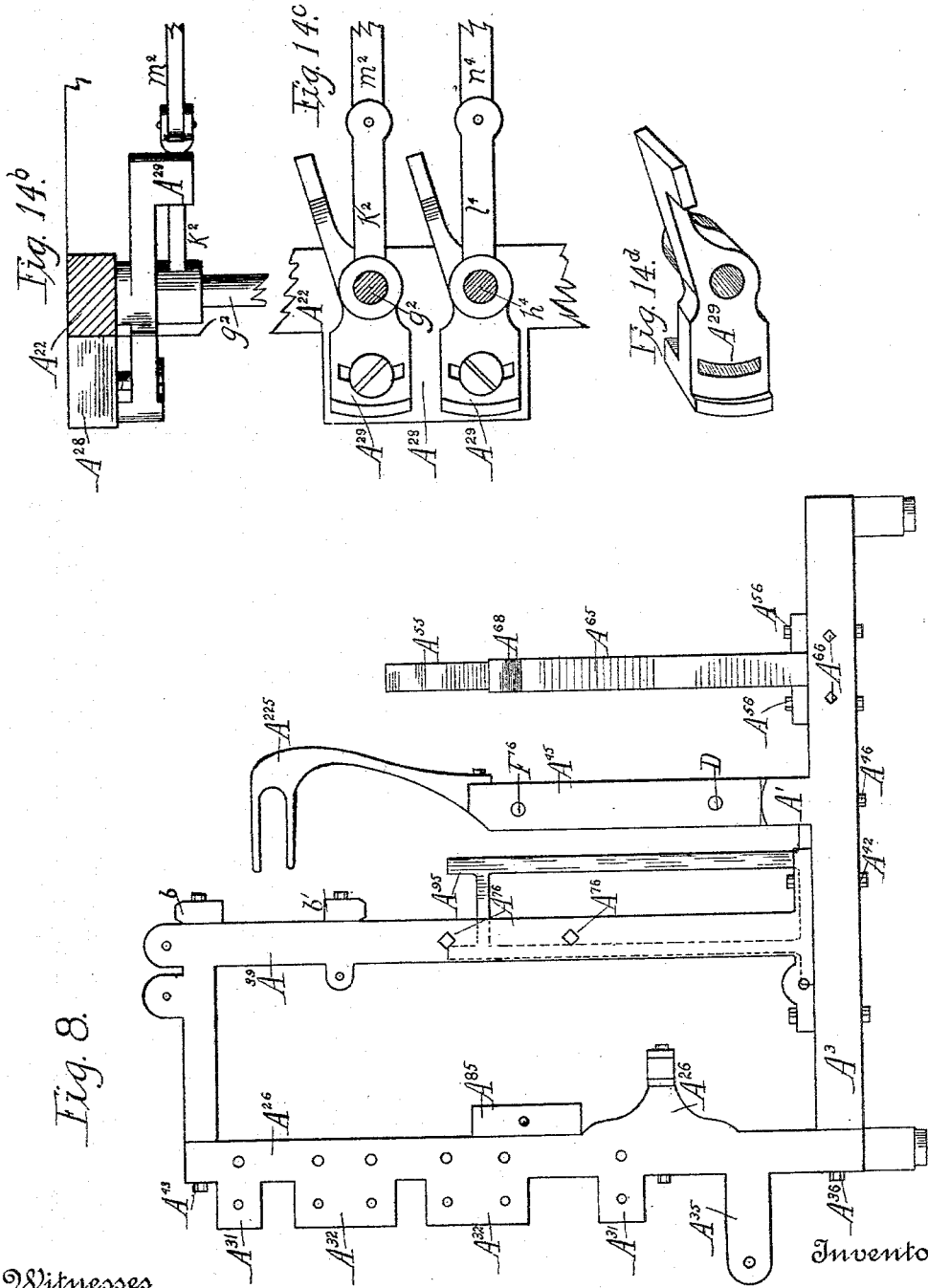
Witnesses
E. A. Short.
M. H. Cahill.
Inventor
Thaddeus Cahill

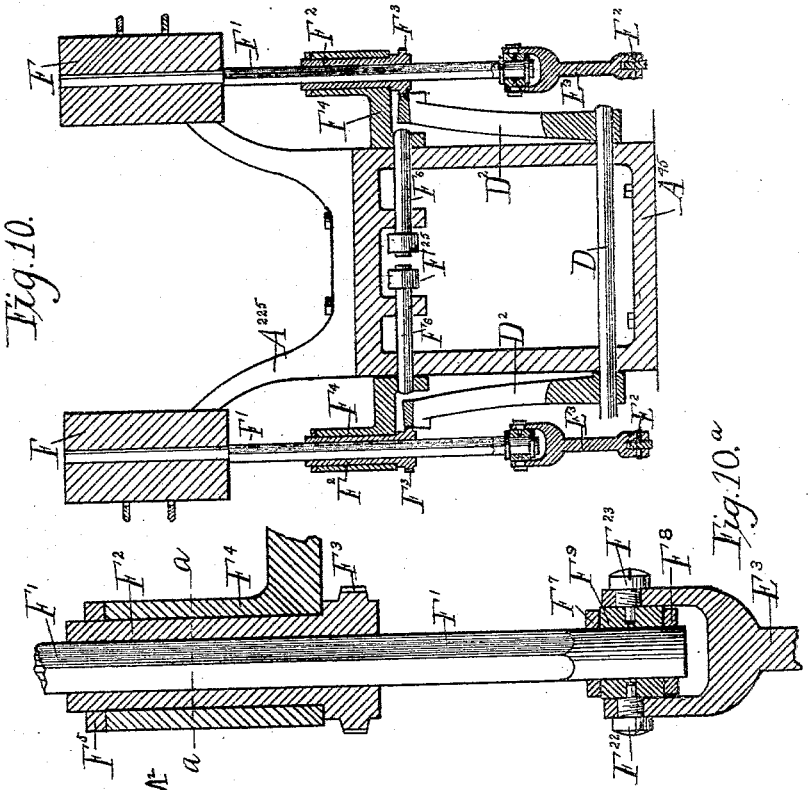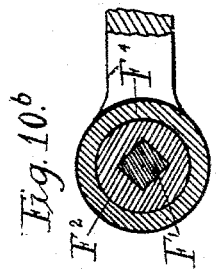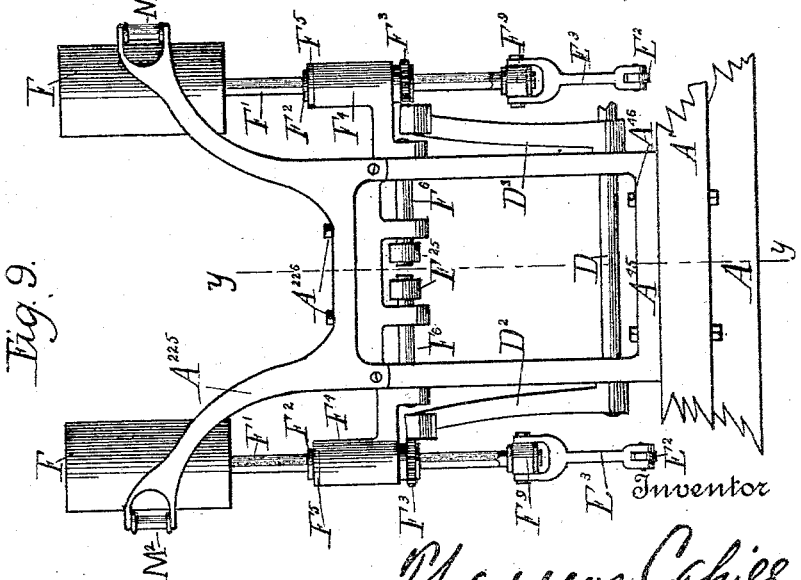

(No Model.)   17 Sheets—Sheet 10.
T. CAHILL.
TYPE WRITING MACHINE.
No. 531,904.   Patented Jan. 1, 1895.
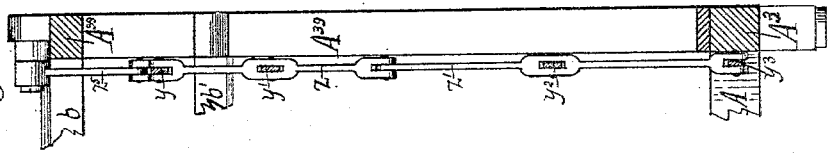
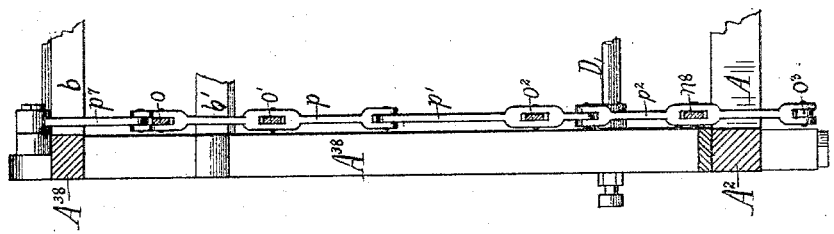
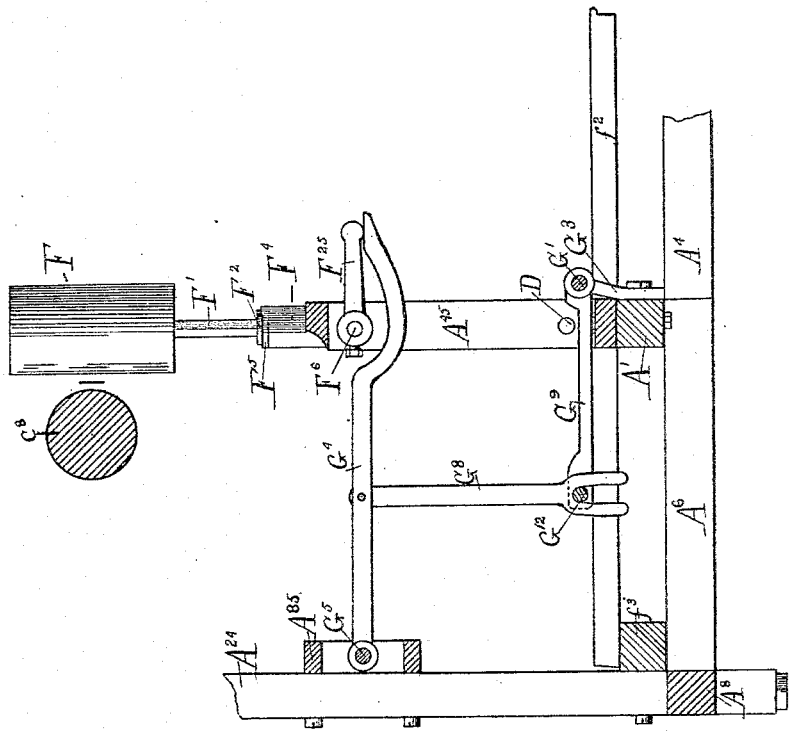
Witnesses
E. A. Short.
M. H. Cahill
Inventor
Thaddeus Cahill.

(No Model.)  17 Sheets—Sheet 11.
T. CAHILL.
TYPE WRITING MACHINE.
No. 531,904. Patented Jan. 1, 1895.
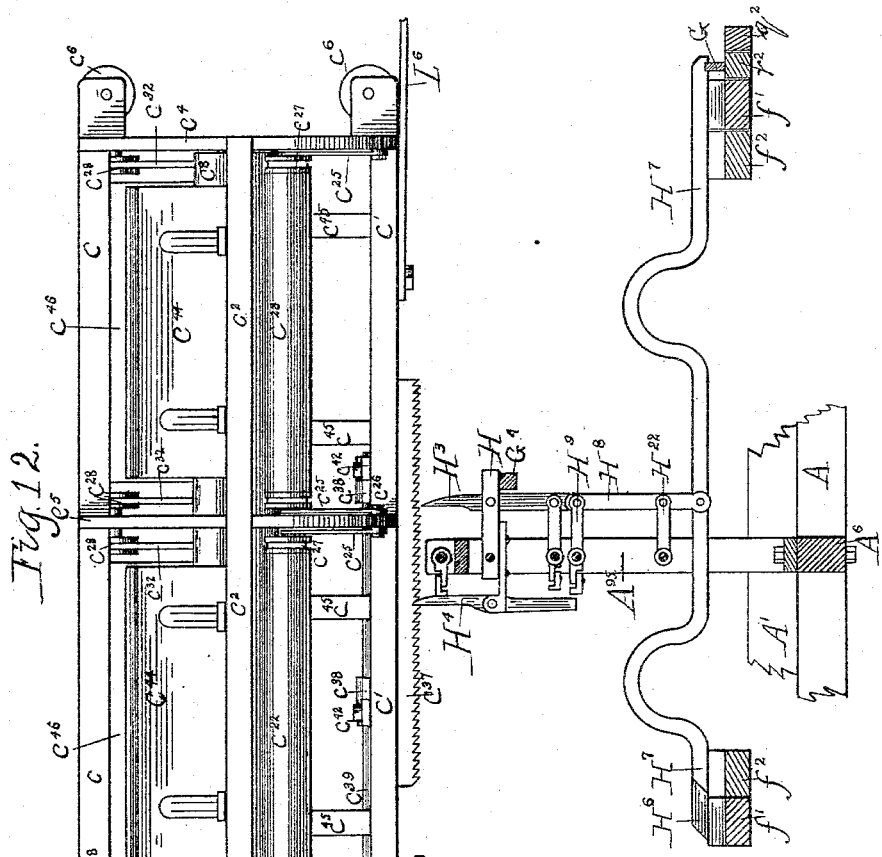
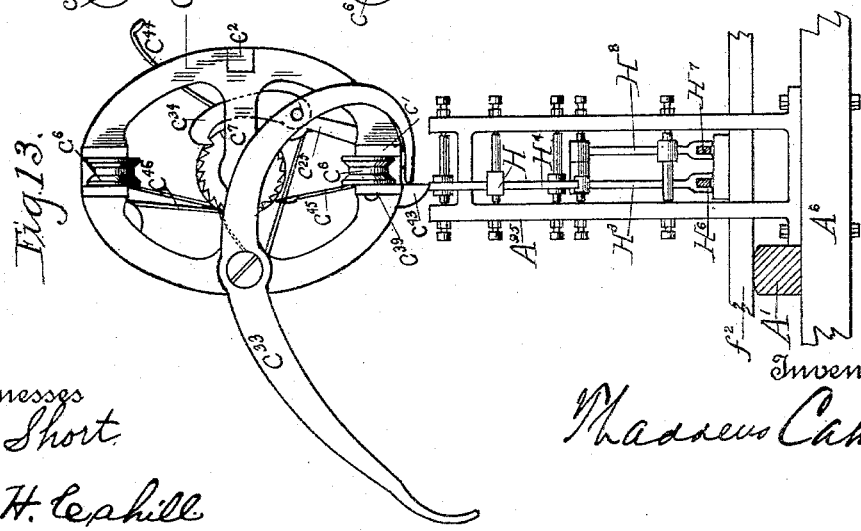
Witnesses
E. A. Short
M. H. Cahill
Inventor
Thaddeus Cahill

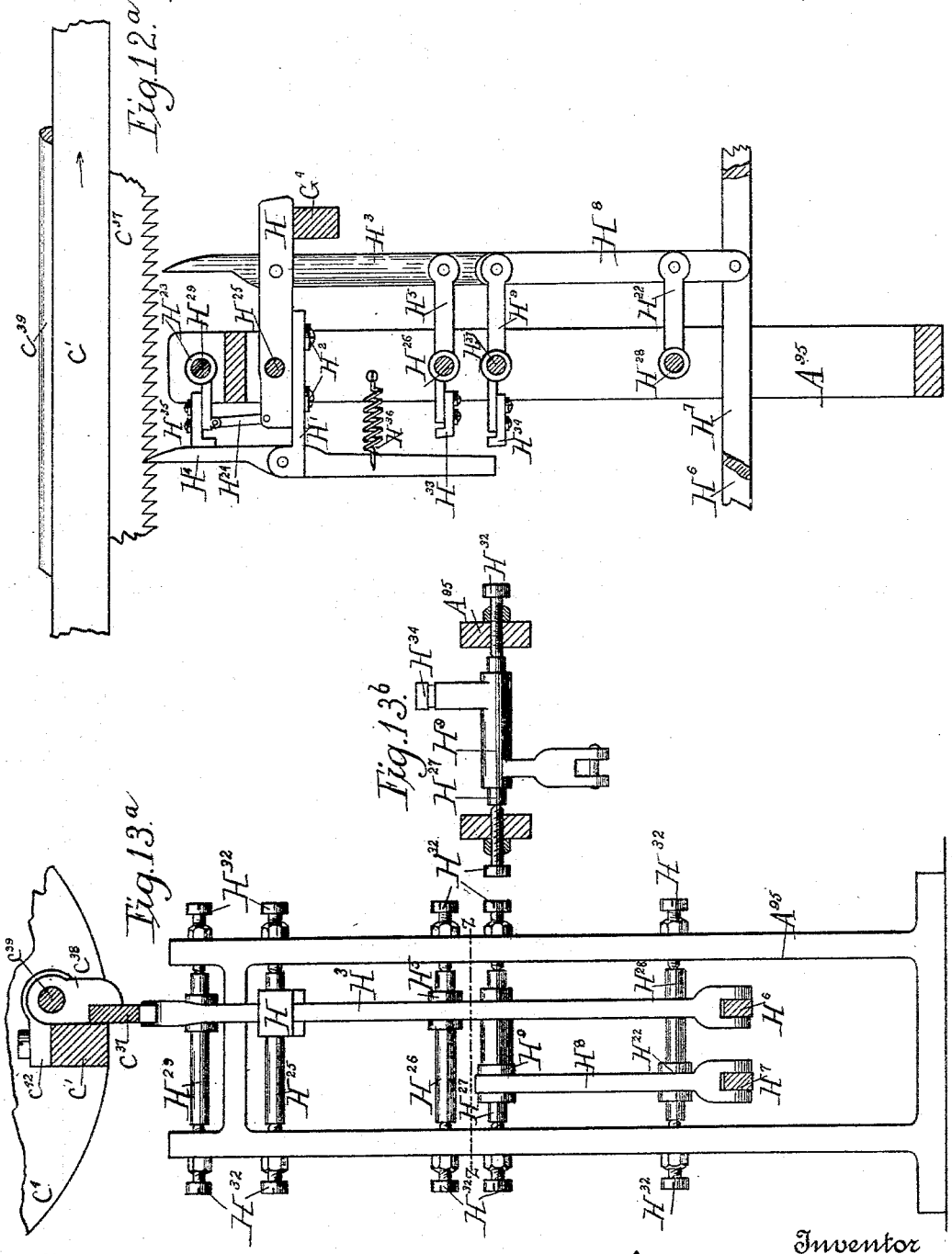

(No Model.) 17 Sheets—Sheet 13.
T. CAHILL.
TYPE WRITING MACHINE.
No. 531,904. Patented Jan. 1, 1895.
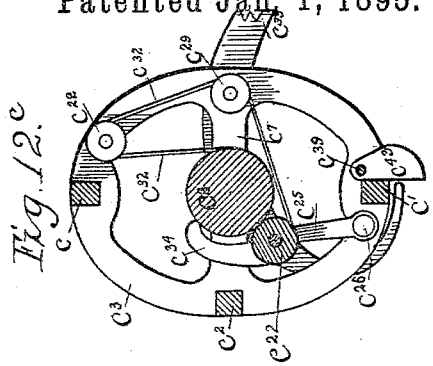
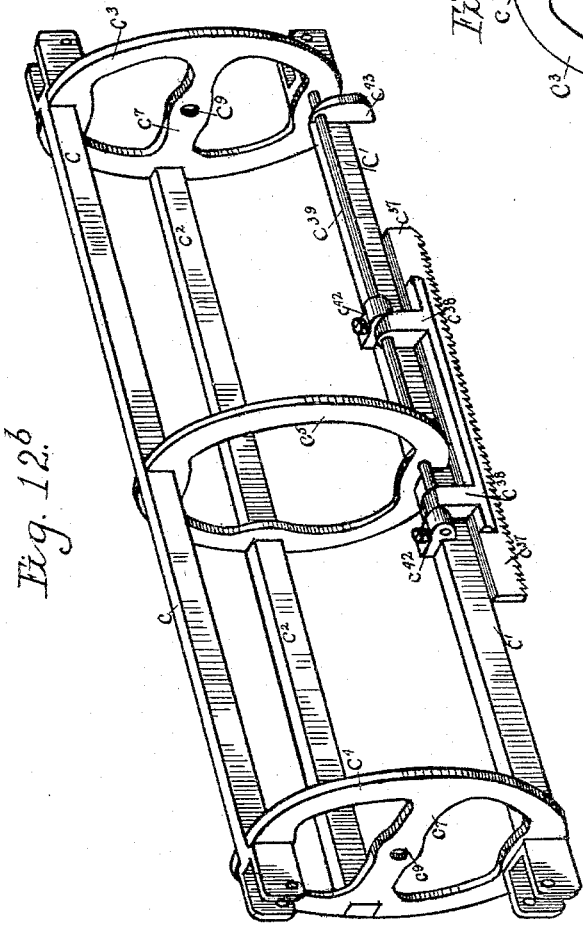
Witnesses
E. A. Short.
M. H. Cahill.
Inventor
Thaddeus Cahill

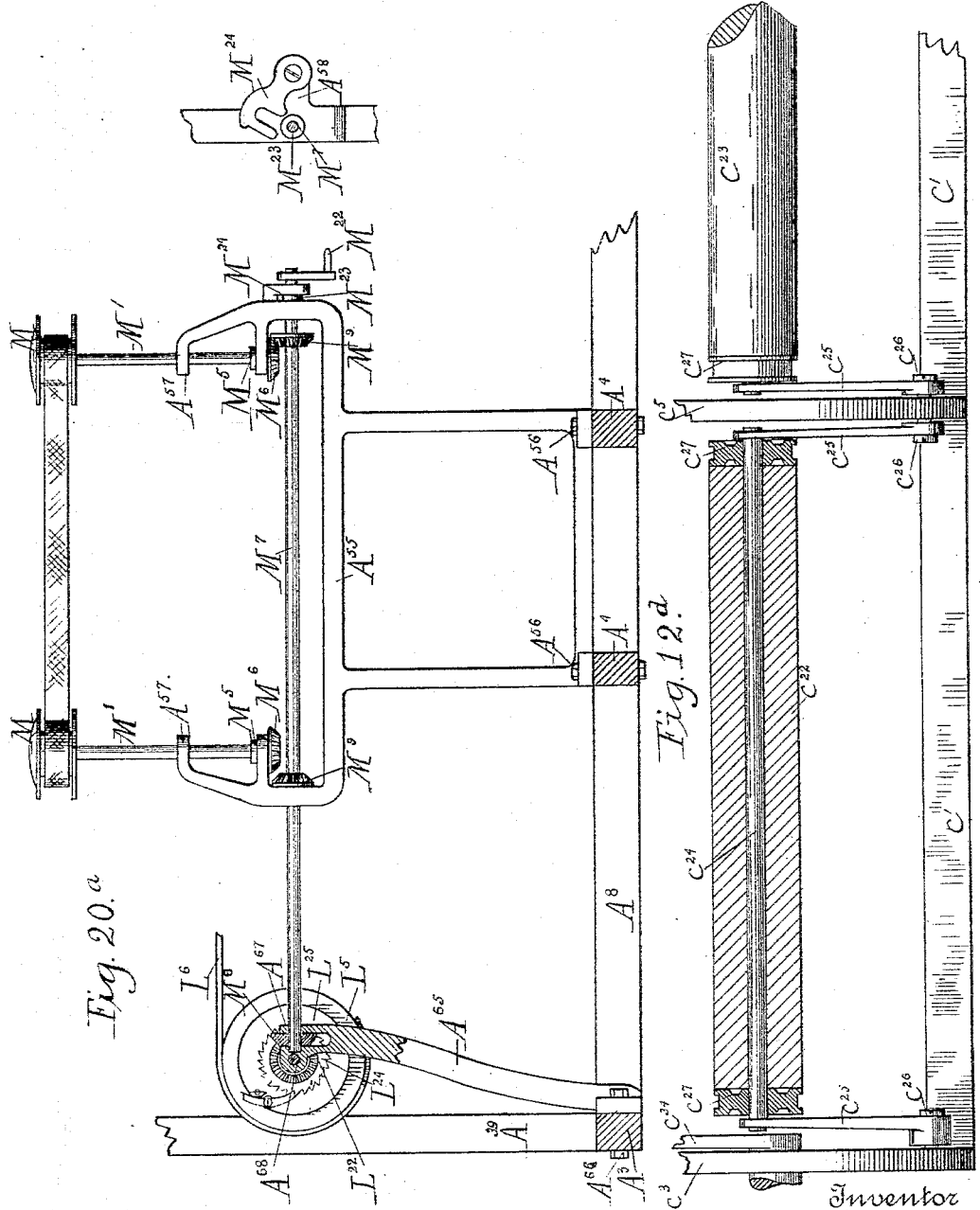

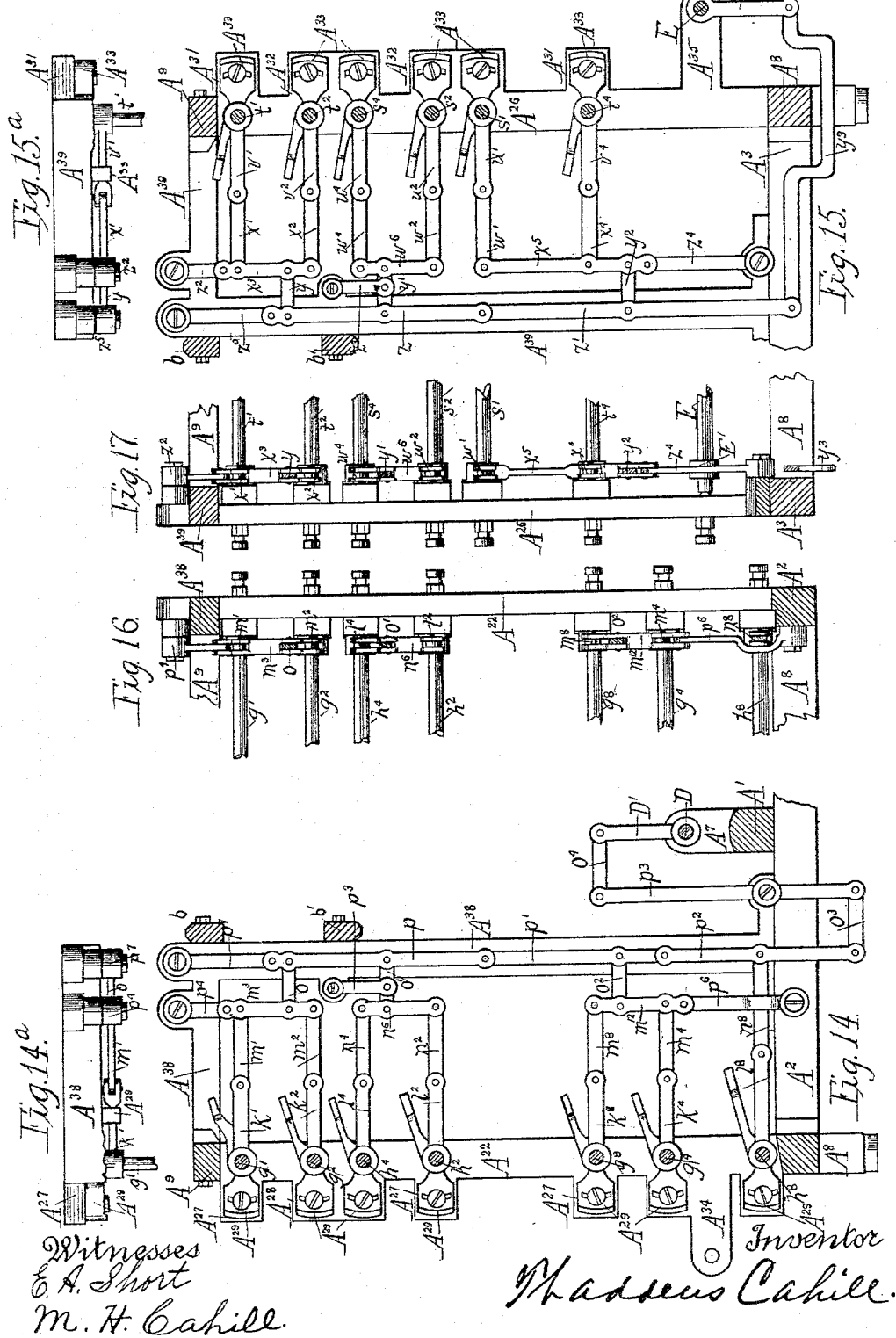

(No Model.) 17 Sheets—Sheet 16.
T. CAHILL.
TYPE WRITING MACHINE.
No. 531,904. Patented Jan. 1, 1895.
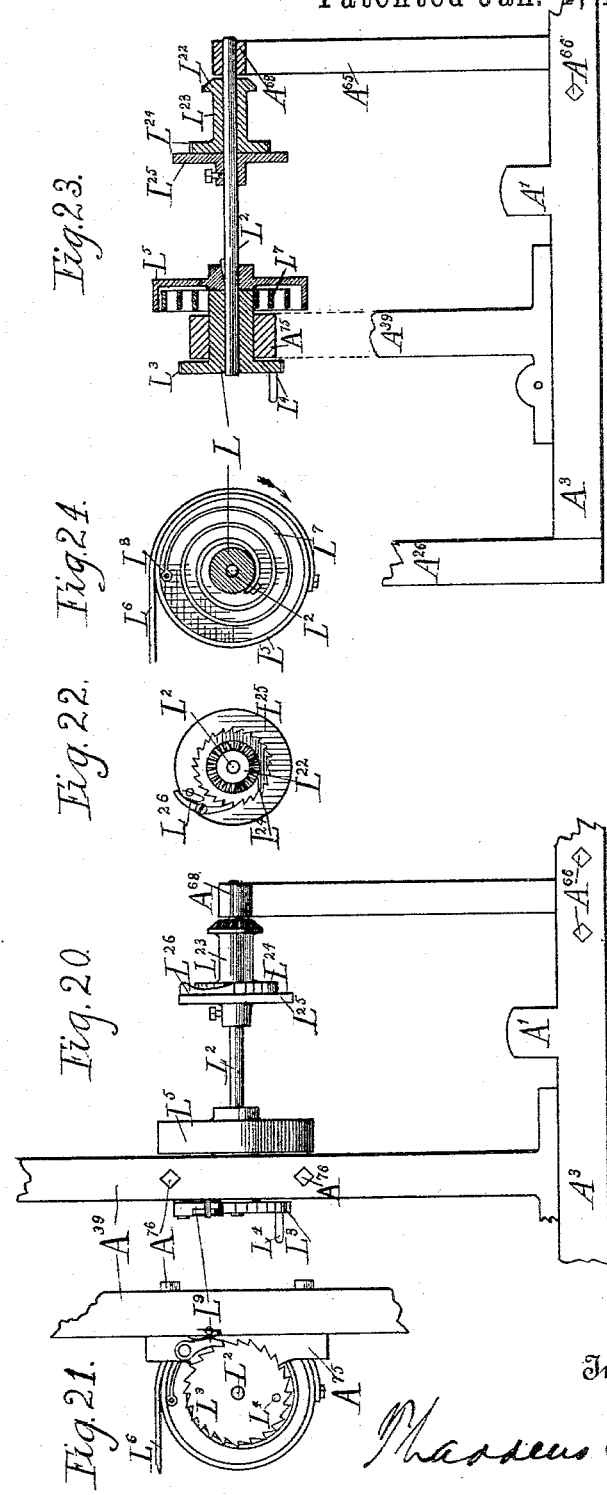
Witnesses
E. A. Short.
M. H. Cahill.
Inventor
Thaddeus Cahill (No Model.)

T. CAHILL.
TYPE WRITING MACHINE.

No. 531,904. Patented Jan. 1, 1895.

*Fig. 25.*

| X | A | M | O | P | . | H | N | B | T | F | R |
|---|---|---|---|---|---|---|---|---|---|---|---|
| xl | al | ml | ol | ph | ak | hl | nl | bl | th | fl | rl |
| xd | ad | md | od | pd | ax | hd | nd | bd | td | fd | rd |
| xi | ai | mi | oi | pi | ag | hi | ni | bi | ti | fi | ri |
| xu | au | mu | ou | pu | az | hu | nu | bu | tu | fu | ru |
| xa | aa | ma | oa | pa | am | ha | na | ba | ta | fa | ra |
| xo | ao | mo | oo | po | ap | ho | no | bo | to | fo | ro |
| x | a | m | o | p |   | h | n | b | t | f | r |
| on | an | mm | on | pn | ab | hn | nn | bn | tn | fn | m |
| xt | at | mt | ot | pt | af | ht | nt | bt | tt | ft | rt |
| xr | ar | mr | or | pr | aj | hr | nr | br | tr | fr | rr |
| xe | ae | me | oe | pe | ac | he | ne | be | te | fe | re |
| xy | ay | my | oy | py | av | hy | ny | by | ty | fy | ry |
| xs | as | ms | os | ps | aw | hs | ns | bs | ts | fs | rs |
| : | 1 | 2 | 3 | 4 | 5 | . | 6 | ng | 7 | 8 | 9 | 0 |

Witnesses—
W. P. Keene.
M. H. Cahill.

Inventor—
Thaddeus Cahill

UNITED STATES PATENT OFFICE.

THADDEUS CAHILL, OF WASHINGTON, DISTRICT OF COLUMBIA.

TYPE-WRITING MACHINE.

SPECIFICATION forming part of Letters Patent No. 531,904, dated January 1, 1895.

Application filed September 24, 1892. Serial No. 446,992. (No model.)

*To all whom it may concern:*

Be it known that I, THADDEUS CAHILL, a citizen of the United States, and a resident of Washington, in the District of Columbia, have invented certain new and useful Improvements in Type-Writing Machines, of which the following is a specification.

The object of my invention is to increase the ease and rapidity with which such machines may be operated: and my invention consists in the parts, improvements and combinations hereinafter described and claimed; but, while referring to the statement of claims at the end of this specification for a formal and definite statement of my invention, I wish here to say briefly that my present invention relates to means for writing two letters simultaneously, and consists in a certain improved type-form, and in the arrangement and combination of the type-form, type-form positioning mechanism and carriage spacing mechanism. As, however, all the details of construction of a type-writer depend upon, and are governed in a great degree by, the arrangement of the type-form and type-form positioning mechanism, I have for the sake of greater clearness and certainty, illustrated and described a complete machine. It will be understood, however, that my invention relates solely to the type-printing mechanism, and to the manner and means of positioning the characters and the printing carriage.

The mechanism herein shown and described in illustration of my invention may be briefly said to consist of (*a*) a suitable paper carriage capable of holding two sheets of paper side by side, or a double sheet of paper, and spacing mechanism for moving such paper carriage; (*b*) two type-forms, each arranged to play to its own printing point, each arranged to move in two different planes or arcs for the purpose of bringing the character or characters to be printed to the printing point, and each having one or more groups of single characters, (that is, groups of characters from which but one character is printed at a time,) and a plurality of groups of double or compound characters (that is, groups of characters so arranged that two characters or a double character as an, fl, print simultaneously); (*c*) keys for the right hand and suitable mechanism interposed between them and the type-forms serving to control the motions of the type-form in one of the arcs or planes before mentioned; (*d*) keys for the left hand, and suitable mechanism interposed between such keys and the type-forms serving to control the movements of the type-forms in the other one of the arcs or planes before mentioned; (*e*) suitable inking mechanism; (*f*) suitable impression mechanism for printing the characters brought to the printing point; (*g*) a single-space key for moving the carriage a single space; and (*h*) a double-space key for moving the carriage two spaces at a time, so that an inter-verbal space may be made at the same time that a letter is printed. It will be understood, however, as before said, that my invention relates only to the type-printing mechanism and to the manner and means of positioning the characters and the paper carriage; and that the various collateral matters described, such as the inking-ribbon mechanism, the impression mechanism, the paper carriage impelling mechanism and the paper carriage itself, are all of them old in so far at least as this present application is concerned, that they form no part of the subject matter of this application, and are in nowise claimed herein. On the one hand, no special importance is attached to them. On the other, I do not confine myself to them. They are shown simply to enable an ordinary mechanic skilled in the art, to embody my invention in an operative machine, without having to contrive anything himself.

For moving the type-forms I use movement synthesizer or movement aggregating devices controlled by a small number of keys and serving to determine numerous different motions of the type-form when different keys or combinations of keys are depressed. Such mechanism, however, while forming an essential element of certain of the combinations hereinafter described and claimed, does not by itself alone form any part of my present invention; but constitutes the subject matter of a prior application, filed May 5, 1892, Serial No. 431,869, (issued August 8, 1893, as Patent No. 502,700.)

Figure 2:
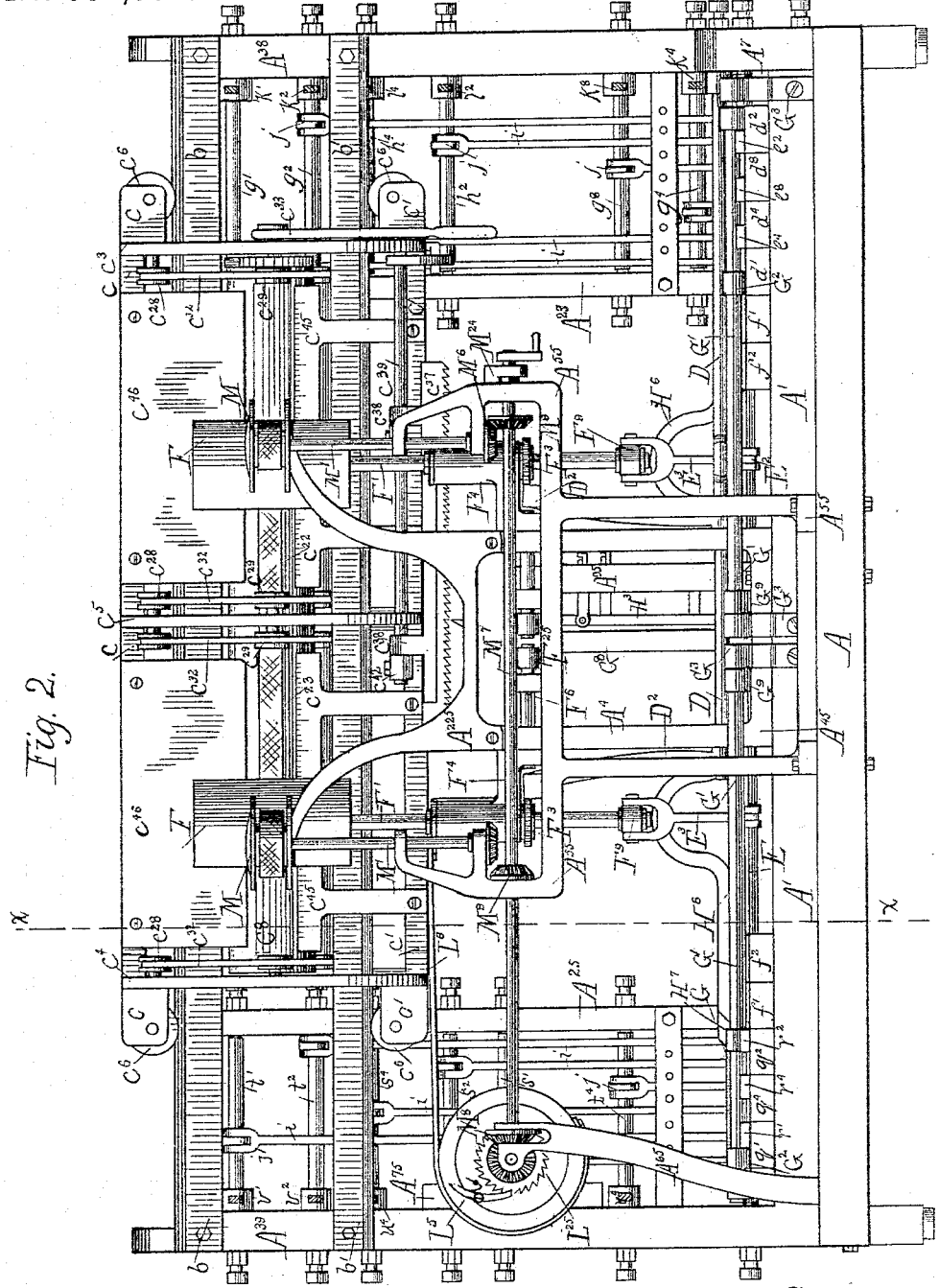
Figure 3:
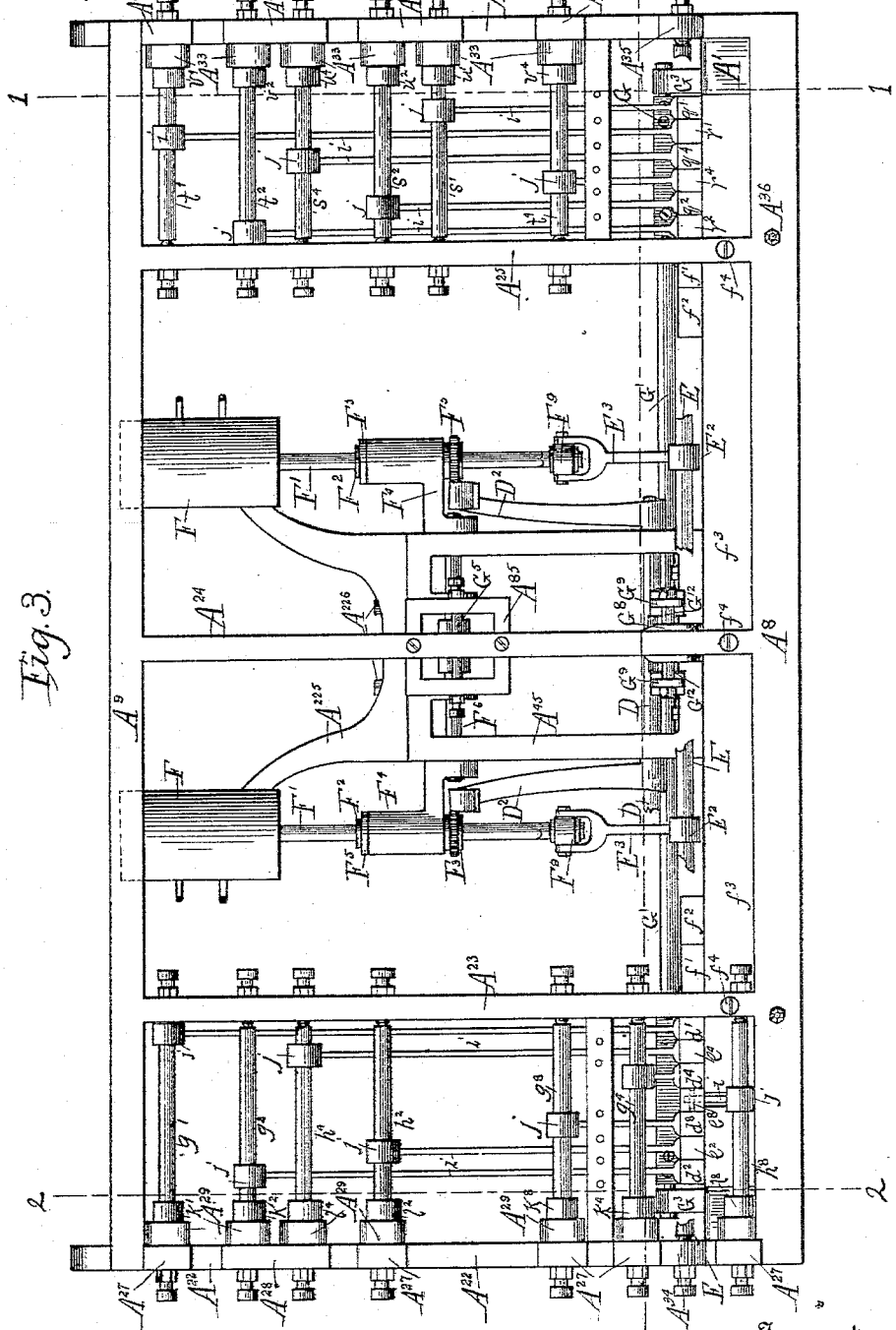
Figure 4:
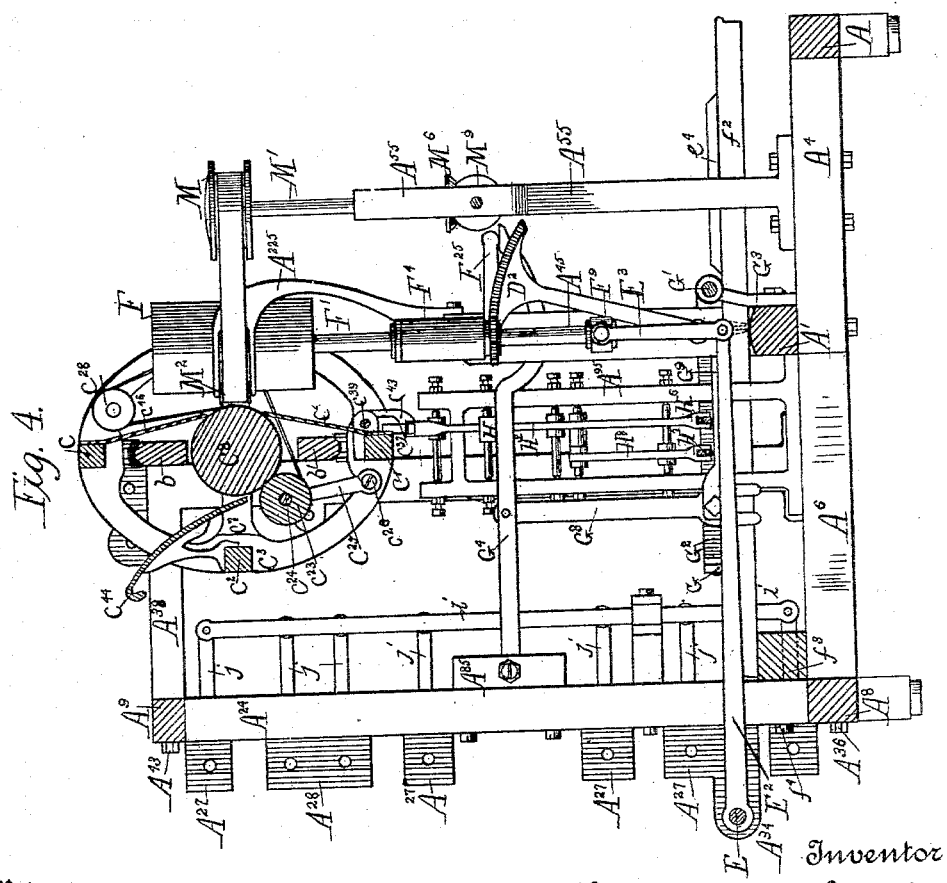

In the accompanying drawings, Figures 1, 2, 3 and 4, are the general views,—Fig. 1 being a top view of the machine; Fig. 2, a front elevation; Fig. 3, a rear elevation, illustrating the mechanism at the back of the machine, the carriage, spacing mechanism, ribbon feed mechanism and carriage motor mechanism not being shown, and Fig. 4 a sectional view, partly in elevation, on the line $x, x$, Figs. 1 and 2. Figs. 5 to 24, inclusive, are detail views. Fig. 5 is a sectional view, partly in plan, on the line $x—x$, Fig. 3, illustrating, the arrangement of the keys and the space frames. Fig. 6 is a top view of the bed plate and back of the main-frame, the back being shown partly in section. Fig. 7 is a rear elevation, illustrating the back of the main-frame. Fig. 8 is a side elevation of the main-frame. Fig. 9 is a front elevation of the type-forms and their mountings. Fig. 10 is a sectional view, seen from the rear, partly in elevation, in a plane parallel to the plane of the preceding figure, and through the center of the type-forms there shown. Fig. $10^a$ is a detail view, on a larger scale than the preceding figure, illustrating more clearly a part of the mechanism shown in the preceding figure. Fig. $10^b$ is a cross-section on the line $a, a$, Fig. $10^a$. Fig. 11, is a sectional view partly in elevation, on the line, $y, y$, Fig. 9. Fig. 12 is a rear view in elevation of the carriage and spacing mechanism. Fig. $12^a$ is a detail view, on a larger scale than the preceding figure, illustrating more clearly the spacing mechanism shown in the preceding figure. Fig. $12^b$ is a detail view in perspective, illustrating the carriage-frame and the spacing rack, viewed from in front. Fig. $12^c$ is a sectional view, partly in elevation, through the carriage-frame, on the line $b, b$, Fig. 12. Fig. $12^d$ is a detail view, partly in elevation, partly in section, in a plane parallel to the plane of Fig. 12, and on a larger scale than Fig. 12, illustrating the pressure rollers hereinafter described, their hangers and mode of connection with the main-frame of the carriage. Fig. 13 is an end elevation of the carriage and spacing mechanism. Fig. $13^a$ is a detail view of the spacing mechanism represented in the preceding figure, on a larger scale than Fig. 13, and viewed from the opposite direction. Fig. $13^b$ is a cross-section on the line $z, z$, Fig. $13^a$. Fig. 14 is a sectional view in elevation on the line 1, 1, Fig. 3. Fig. $14^a$ is a detail top view, illustrating a portion of the mechanism represented in Fig. 14. Fig. $14^b$ is a detail sectional view, partly in plan, in a plane transverse to the plane of Fig. 14, the line of section being midway between the parts $k'$ and $k^2$, Fig. 14. Fig. $14^c$ is a detail view on a larger scale than Fig. 14, illustrating a portion of the mechanism shown in that figure. Fig. $14^d$ is a perspective detail also on a larger scale than Fig. 14, illustrating one of the stops shown in that and other figures. Fig. 15 is a sectional view in elevation on the line 2, 2, Fig. 3. Fig. $15^a$ is a detail top-view, illustrating a portion of the mechanism represented in Fig. 15. Fig. 16 is a detail sectional elevation in a plane transverse to the plane of Fig. 14 and upon a line immediately to the right of the parts $p^4$ and $p^6$, Fig. 14, looking toward the back of the machine. Fig. 17 is a similar view in a plane transverse to the plane of Fig. 15, the line of section being immediately to the left of the parts $z^2$ and $z^4$, Fig. 15, looking toward the back of the machine. Fig. 18 is likewise a detail sectional elevation, in a plane transverse to the plane of Fig. 14, the line of section being immediately to the left of the parts $p^7$ and $p^2$, Fig. 14, looking toward the front of the machine. Fig. 19 is a similar view in a plane transverse to the plane of Fig. 15, the line of section being immediately to the right of the parts, $z^5$ and $z'$, Fig. 15, looking to the front of the machine. Fig. 20 is a detail side-elevation, illustrating the carriage motor mechanism. Fig. $20^a$ is a detail front elevation, illustrating the ribbon spool mechanism, and the manner in which it is connected with the carriage motor mechanism. Fig. 21 is a rear elevation of the carriage motor mechanism. Fig. 22 is a detail front elevation of the same. Fig. 23 is a sectional elevation in a plane parallel to the plane of Fig. 20, through the center of the mechanism illustrated in Fig. 20. Fig. 24 is a cross-section in a plane parallel to the plane of Figs. 21 and 22, through the center of the part $L^5$, Fig. 20; and Fig. 25 is a detail rear elevation of the type-form, drawn to a larger scale than the other figures, illustrating the arrangement of compound or double-letter characters thereon, said characters being represented, for the sake of clearness, naturally as they print, instead of being shown inverted as they are formed on the type-form.

In many of the views parts which would be seen in actually looking at the machine have been omitted in order to avoid obscuring other parts which it was more important to illustrate. In particular the arrangement of links and levers illustrated in Figs. 14, 15, 16, 17, 18 and 19 have been omitted from Figs. 1, 2, 3 and 4.

The aim has not been to represent the machine in each view with photographic accuracy, but to make clear the essential features and principles of construction.

*The main-frame.*—(See particularly Figs. 5, 6, 7 and 8.) The frame of the machine is made of cast-iron or other suitable material. Its principal parts are a bed-plate; a back; and two side-pieces, serving to support the carriage-rails hereinafter mentioned, and to bind the back and bed-plate together more firmly. To these larger parts many smaller ones are attached, as will be made clear hereinafter. The bed-plate is cast in one piece. It consists of a front rib, A; a horizontal, key-supporting rib, A', lying parallel with the front rib and some distance behind it; side ribs, $A^2$ and $A^3$, lying at right angles to the ribs, A and A', and in the same horizontal plane as the rib, A; central connecting ribs, $A^4$, $A^4$, lying parallel with the ribs, $A^2$ and $A^3$; and a backwardly extending rib, $A^6$, lying parallel with the ribs, $A^2$, $A^3$ and $A^4$, above mentioned, and in the same horizontal plane therewith. A short vertical standard or upright, $A^7$, projects from the side-rib, $A^2$, immediately above the key supporting rib, $A'$. Said part, $A^7$, serves to form a bearing or support for one of the rock-shafts hereinafter described. The side ribs, $A^2$ and $A^3$, are furnished at their ends remote from the front rib, A, with inwardly facing projections, $a, a$, at right angles to said ribs, $A^2$ and $A^3$, and parallel with the ribs, A and $A'$; and the rib, $A^6$, is provided with similar extensions, $a', a'$, all which serve to connect the bed-plate of the machine with the back. The back of the main-frame is also cast in one piece, and consists of a lower rib, $A^8$, and an upper rib, $A^9$, (both of which lie parallel with the front rib, A, and key-supporting rib, $A'$, before mentioned;) and vertical ribs, $A^{22}$, $A^{23}$, $A^{24}$, $A^{25}$ and $A^{26}$, parallel with each other, connecting the upper and lower ribs, $A^8$ and $A^9$, and lying at right angles to said ribs, $A^8$ and $A^9$ and to the ribs, A, $A'$, $A^2$ and $A^3$, before mentioned. The vertical rib $A^{22}$ is furnished with small arms or projections $A^{27}$, $A^{27}$, $A^{28}$, &c., which serve to hold certain stops $A^{29}$, hereinafter described, by which the movement of the right hand set of keys is limited and determined. The vertical rib $A^{26}$, in like manner, is furnished with similar arms or projections $A^{31}$, $A^{32}$, $A^{32}$, $A^{31}$, which serve to hold stops $A^{33}$, by which the movement of the left hand set of keys is arrested. The ribs $A^{22}$ and $A^{26}$, respectively, are furnished with corresponding arms or projections, $A^{34}$ and $A^{35}$, which serve to support the rock-shaft E, hereinafter described. The back is attached to the bed-plate by bolts $A^{36}$, $A^{36}$, &c., that bind the lower rib $A^8$ of the former to the projections $a, a, a'$ and $a'$, of the latter.

The side-pieces $A^{38}$ and $A^{39}$, of the main-frame, are castings, having each a lower horizontal part or foot; a vertical or upright part; and an upper, horizontal, backward extending part. The lower horizontal part or foot is secured by bolts, $A^{42}$, $A^{42}$, to one of the side ribs of the bed-plate; and the upper, horizontal, backward extending part, is secured by a bolt, $A^{43}$, to the upper, horizontal rib, $A^9$, of the back piece. Thus the back piece, bed-plate, and side pieces are firmly bound together.

A casting $A^{45}$, of the form shown in the drawings, (see particularly Figs. 2, 8, 9, and 10,) is attached by bolts $A^{46}$, to the key-supporting-rib, $A'$. Said casting $A^{45}$, serves as a bearing for the horizontal shafts upon which the type-form sleeve-bearings hereinafter described are mounted. It serves also as a bearing for the rock-shaft, hereinafter described, by which the type-form sleeves are rotated.

A casting $A^{55}$, of the form illustrated in the drawings, (see particularly Figs. 1, 2 and $20^a$) is attached by bolts, $A^{56}$, $A^{56}$, to the ribs $A^4$, $A^4$. Said casting, $A^{55}$, serves as a bearing for the horizontal ribbon-feed shaft, hereinafter described; and also as a bearing for the vertical ribbon shafts, hereinafter described.

A casting $A^{65}$, of the form illustrated in the drawings, (see particularly Figs. 1, 2, 20, $20^a$, and 23,) is attached by bolts, $A^{66}$, $A^{66}$, to the side-rib, $A^3$. It serves to support one end of the shaft upon which the wheel that moves the carriage is mounted; and also to support one end of the ribbon-feed shaft, hereinbefore mentioned and hereinafter described.

A casting $A^{75}$, of the form illustrated in the drawings, (see particularly, Figs. 1, 2, and 21,) is attached by machine screws, $A^{76}$, $A^{76}$, to the side piece, $A^{39}$. Said casting, $A^{75}$, serves as a journal or bearing for a sleeve, in which bearing the before-mentioned shaft on which the wheel that moves the carriage is mounted.

A casting $A^{85}$, of the form shown in the drawings, (see Figs. 1, 3, 4, 8, and 11,) is attached by bolts or machine screws, $A^{86}$, $A^{86}$, to the vertical rib, $A^{24}$, of the main-frame back. Said casting, $A^{85}$, serves to support the center-screws by which the printing-lever, hereinafter described, is mounted.

A casting, $A^{95}$, of the form illustrated in the drawings (see Figs. 2, 4, 8, 12, $12^b$, 13, and $13^a$), is attached to the backward extending rib, $A^6$, of the bed-plate, by bolts or machine screws, $A^{96}$, $A^{96}$. Said casting, $A^{95}$, serves to support the levers on which the space dogs hereinafter described, and certain other parts of the letter spacing mechanism hereinafter described, are mounted.

A casting, $A^{225}$, of the form illustrated in the drawings, (see Figs. 1, 2, 4, 9, and 10,) is attached to the top of the casting, $A^{45}$, by machine screws. Said casting, $A^{225}$, serves to form a bearing for certain little ribbon pulleys hereinafter described.

*Track for the paper-carriage.*—(See Figs. 1, 2, 4, and 8.) The track for the paper-carriage to run upon is formed by parallel metal rails, $b$ and $b'$, which are attached to the side pieces, $A^{38}$ and $A^{39}$, by bolts and nuts, $b^2$ and $b^3$.

*The paper-carriage.*—(See Figs. 1, 2, 4, 12, $12^b$, $12^c$, $12^d$, and 13.) The paper-carriage is adapted and arranged to carry and hold in place to be printed on, two sheets of paper, arranged side by side.

A paper carriage is an element of some of the combinations herein described and claimed; but the paper carriage is not claimed herein by itself alone; nor is any special importance attached, so far as this specification is concerned, to the peculiar form of paper carriage illustrated herein. Such paper carriage forms a part of the subject matter of another application of even date herewith, Serial No. 446,991.

The paper carriage, as illustrated, consists, in its most essential elements, of a carriage-frame; an impression cylinder, around which the paper passes, and against which the type-forms strike, when the letters and other characters are printed; smaller pressure rollers, and elastic bands running on pulleys and serving to feed the paper to the impression cylinder; interlinear spacing mechanism, whereby the impression cylinder is rotated and the paper fed from line to line; a space-rack for the letter spacing; and mechanism for impelling the carriage.

The carriage-frame is formed of a top bar, $c$; a bottom-bar, $c'$; a back-bar, $c^2$; a right-hand end-piece, $c^3$; a left-hand end-piece, $c^4$; and a center-piece, $c^5$. The bars, $c$, $c'$ and $c^2$ are parallel; and $c$ and $c'$ are made with enlarged and U-shaped ends, which form bearings for wheels, $c^6$, $c^6$, $c^6$, $c^6$, that run on the rails, $b$, $b'$. The pieces, $c^3$, $c^4$, and $c^5$, are substantially similar, except that the end-pieces, $c^3$ and $c^4$, have a cross-arm, or cross-rib, $c^7$, which the center-piece, $c^5$, has not. The bars $c$, $c'$ and $c^2$, are secured to the end-pieces, $c^3$ and $c^4$, and center-piece, $c^5$, by machine screws. The impression cylinder, $c^8$, is supported by center-screws, which are screwed fast into said cylinder, $c^8$, and which pass through holes, $c^9$, in the cross-arms, $c^7$, $c^7$, of the end-pieces, $c^3$ and $c^4$, which form bearings for said screws, and thus support the impression cylinder. The pressure-rollers, $c^{22}$ and $c^{23}$, lie in line with each other, parallel with and in close proximity to, the impression cylinder, $c^8$. These rollers, $c^{22}$ and $c^{23}$, are each furnished with a central shaft, $c^{24}$, and this shaft is supported at each end by levers or hangers, $c^{25}$, $c^{25}$, which are fulcrumed upon shoulder-screws, $c^{26}$, &c., screwed fast into the end-pieces, $c^3$ and $c^4$, and the center-piece, $c^5$. Little belt-wheels, or pulleys, $c^{27}$, $c^{27}$, are attached to the shafts, $c^{24}$, $c^{24}$, in close proximity to the pressure rolls, $c^{22}$, $c^{22}$, (that is, one of the pulleys, $c^{27}$, at each end of each of the rolls, $c^{22}$, $c^{23}$.) For each of the pulleys, $c^{27}$, $c^{27}$, &c., before mentioned, there is a pair of corresponding pulleys, $c^{28}$, $c^{29}$, lying in the same vertical plane as the particular pulley, $c^{27}$, with which they correspond. The pair of pulleys, $c^{28}$, $c^{29}$, corresponding to the pulley, $c^{27}$, at the right hand end of the roll, $c^{22}$, lie in close proximity to the surface of the right-hand end-piece, $c^3$, proximate to the center-piece, $c^5$; and are supported by shoulder screws, fixed in the said end-piece $c^3$. The pair of pulleys, $c^{28}$, $c^{29}$, corresponding to the pulley, $c^{27}$, at the left-hand end of the roll, $c^{22}$, lie in close proximity to the surface of the center-piece, $c^5$, which is proximate to the end-piece, $c^3$, and are supported by shoulder screws set fast in said center-piece, $c^5$. The pair of pulleys, $c^{28}$, $c^{29}$, corresponding to the pulley, $c^{27}$, at the right-hand end of the roll, $c^{23}$, lie in close proximity to the surface of the center-piece, $c^5$, which is proximate to the left-hand end piece $c^4$; and are supported by shoulder screws set fast in said center-piece, $c^5$. The pair of pulleys, $c^{28}$, $c^{29}$, corresponding to the pulley, $c^{27}$, at the left hand end of the roll, $c^{23}$, lie in close proximity to that surface of the left-hand end-piece, $c^4$, which is proximate to the center-piece, $c^5$; and are supported by shoulder screws, set fast in said end piece, $c^4$. An endless rubber band, $c^{32}$, connects each pair of pulleys, $c^{28}$, $c^{29}$, with the corresponding pulley, $c^{27}$. These bands serve to press the rolls, $c^{22}$ and $c^{23}$, in contact with the impression cylinder, $c^8$, and to guide and feed the sheets of paper to the impression cylinder, $c^8$, and to keep them in contact therewith.

The mechanism for making the interlinear spaces is substantially similar to that used in the machine well known in the art and trade as the "Remington standard type writer." There are differences in form, size and proportion, but the essentials are the same. It consists of a space handle, $c^{33}$; a feed-pawl, $c^{34}$; a ratchet-wheel, $c^{35}$, attached to the impression cylinder, $c^8$; and a spring check, or check-spring, $c^{36}$. The space-handle, $c^{33}$, is centered upon a shoulder screw, set fast in the right-hand end-piece, $c^3$. The feed-pawl, $c^{34}$, is attached to the space-handle and carried by it, being set upon a shoulder screw set fast in the space-handle. The feed-pawl acts upon the ratchet-wheel, $c^{35}$. The check-spring, $c^{36}$, serves to lock the ratchet-wheel, $c^{35}$, and impression cylinder attached thereto, when not acted upon by the feed-pawl, and to insure a uniform movement from line to line. The construction and operation of these parts, being well known, will require no further description.

The space-rack, $c^{37}$, is attached by machine screws to a swinging frame, which is composed of the part, $c^{38}$, and rod, $c^{39}$. The rod, $c^{39}$, is supported by bearings, $c^{42}$, $c^{42}$, attached by screws to the bottom-bar, $c'$, of the carriage-frame. An arm, $c^{43}$, is fixed to the rod, $c^{39}$, at the right-hand end thereof. The rear end of the space-handle, $c^{33}$, acts upon the arm, $c^{43}$, to withdraw the rack, $c^{27}$, from contact with the space-dogs, $H^3$ and $H^4$, hereinafter described, in much the same manner as the space handle in the Remington type writer raises the space-rack from contact with the space-dogs, when a line-space is made. The arrangement of the space-dog, and the parts by which they are controlled and operated will be described hereinafter.

$c^{44}$, $c^{44}$, are the paper holders. Each consists of a main part, or body, of sheet metal, and little stiffeners of cast-iron, or other suitable material, attached thereto. Screws pass through these stiffeners into the back-bar, $c^2$, and thus hold the paper-holder in its place.

$c^{45}$, $c^{45}$, are spring index-plates, which serve to hold the sheets of paper against the impression cylinder, $c^8$, and as indexes. They are attached by screws to the bottom-bar, $c'$.

$c^{46}$, $c^{46}$, are guides for the paper. They are made of sheet metal and attached by screws to the top-bar, $c$. They serve to prevent the paper from feeding on itself.

*Type-form controlling mechanism.*—(See particularly Figs. 1, 2, 3, 14, and 15.) I employ two cylindrical type-forms, each of which is arranged to print at its own printing point. Each type-form is adapted to print very frequently two letters at a time, each hand serving to determine one of the letters to be printed. There are two sets of keys, a right-hand set, and a left-hand set, placed preferably some distance apart. The right-hand set serves to rotate the type-forms, so as to select the first or only character to be printed; the left-hand set serves to reciprocate the type-forms, so as to select the second character to be printed simultaneously with the first character. The right-hand set consists of the keys $d'$, $d^2$, $d^4$, $d^8$, $e^2$, $e^4$, $e^8$, $f'$, and $f^2$. The keys $d'$, $d^2$, $d^4$, and $d^8$, serve to rotate the type-forms in one direction or positively. The keys $e^2$, $e^4$, and $e^8$, serve to rotate the type-forms in the opposite direction or negatively. The keys $f'$ and $f^2$, serve only to make spaces. All the keys are fulcrumed or centered in the same manner as piano keys, that is, upon pins, driven into the key-supporting rib, A'. The rear ends of the keys rest normally upon a felt covered block, $f^3$.

There are at the back of the machine, seven rock-shafts, $g'$, $g^2$, $g^4$, $g^8$, $h^2$, $h^4$, and $h^8$, supported by center-screws or trunnions, set in the ribs $A^{22}$ and $A^{23}$, and held in place by lock nuts. The rock-shafts, $g'$, $g^2$ $g^4$, $g^8$, $h^2$, $h^4$, and $h^8$, respectively, correspond respectively with the keys $d'$, $d^2$, $d^4$, $d^8$, $e^2$, $e^4$, and $e^8$, and are connected with them so as to be moved by them, the connection being made in each case by means of an arm, $j$, firmly attached to the rock-shaft, and a push-up, $i$, connected with said rock arm and interposed between it and the corresponding key. The rock-shafts, $g'$, $g^2$, $g^4$, $g^8$, $h^2$, $h^4$ and $h^8$, respectively, have arms, $k'$, $k^2$, $k^4$, $k^8$, $l^2$, $l^4$ and $l^8$, respectively, connected with them in a suitable manner, (as for instance by shrinking,) so that they move with their respective rock-shafts, whenever said rock-shafts are moved by the keys with which they are connected. The rock arms, $k'$ and $k^2$, are connected by links $m'$ and $m^2$, respectively, with opposite ends of a lever $m^3$. The rock arms $l^2$ and $l^4$, respectively, are connected by links, $n^2$ and $n^4$, respectively with opposite ends of a lever $n^6$; and the rock arms $k^4$ and $k^8$, respectively, are connected by arms $m^4$ and $m^8$, respectively, with opposite ends of a lever $m^{12}$. The lever $m^3$ is connected by a link, $o$, with a lever, $p$. The lever $n^6$, is likewise connected with said lever $p$, by a link $o'$. The lever, $m^{12}$, is connected by a link $o^2$, with a lever $p'$, whose upper end is connected with the lower end of the lever, $p$, and whose lower end is connected with the upper end of a similar lever, $p^2$. The link, $n^8$, connected with the rock arm $l^8$, is also connected with the lever $p^2$. A link, $o^3$, serves to connect the lever, $p^2$, with the motion multiplying lever, $p^3$, which is connected by a link, $o^4$, with the arm, D', of the rock-shaft, D, which moves the type-forms in a manner hereinafter described. The levers, $m^3$, $n^6$, $m^{12}$ and $p$, respectively, are supported and held in their proper vertical positions by supporting levers, $p^4$, $p^5$, $p^6$ and $p^7$, respectively. Said supporting levers are centered or fulcrumed upon shoulder screws and are pin jointed to the parts which they support. The left-hand keys are marked, $q'$, $q^2$, $q^4$, $r'$, $r^2$, $r^4$, $f'$, and $f^2$. The keys $q'$, $q^2$ and $q^4$, serve to move the type-forms upward or positively, the keys $r'$, $r^2$ and $r^4$, serve to move the type-forms downward or negatively. The keys $f'$ and $f^2$, serve only to make spaces. At the back of the machine there are six rock-shafts, $s'$, $s^2$, $s^4$, $t'$, $t^2$, and $t^4$, supported by center screws or trunnions, set in the ribs $A^{25}$ and $A^{26}$, and held in place by lock nuts. Said rock-shafts $s'$, $s^2$, $s^4$, $t'$, $t^2$ and $t^4$, respectively, correspond with the keys $q'$, $q^2$, $q^4$, $r'$, $r^2$, and $r^4$, respectively, and are connected with said keys so as to be moved by them; the connection being made in each case by means of an arm, $j$, firmly attached to the rock-shaft, and a push-up, $i$, connected with said rock-arm, and interposed between it and the corresponding key. The rock-shafts $s'$, $s^2$, $s^4$, $t'$, $t^2$ and $t^4$, respectively, have arms $u'$ $u^2$, $u^4$, $v'$, $v^2$ and $v^4$, respectively, connected with them in a suitable manner, (as for instance, by shrinking,) so that they move with their respective rock-shafts, whenever said rock-shafts are moved by the keys with which they are connected. The rock shaft arms, $v'$ and $v^2$, respectively are connected by links, $x'$ and $x^2$, respectively with the opposite ends of a lever, $x^3$. The rock-arms $u^2$ and $u^4$, respectively are connected by links $w^2$ and $w^4$, respectively, with the opposite ends of a lever, $w^6$; and the arms $u'$ and $v^4$, respectively are connected by links $w'$ and $x^4$, respectively with a lever, $x^5$. The levers $x^3$ and $w^6$, respectively, are connected by links $y$ and $y'$, respectively, with the top and middle of a lever, $z$; and the lever $x^5$, is connected by a link $y^2$, with a lever $z'$, whose upper end is connected with the lower end of the lever $z$ and whose lower end is connected by a link $y^3$, with the arm, E', of the rock-shaft, E, by which the type-forms are moved up and down in a manner hereinafter described. The levers, $x^3$, $w^6$, $x^5$, and $z$, respectively are supported and held in their proper vertical positions by supporting levers, $z^2$, $z^3$, $z^4$, and $z^5$, respectively. Said supporting levers are centered or fulcrumed upon shoulder screws, and are pin-jointed to the parts which they support.

The mode of operation of the movement synthesizers will be more conveniently explained after I have described the type-forms and the manner in which they are mounted and connected with the movement synthesizers.

*The type-forms.*—(See particularly Figs. 1, 2, 3, 4, 9, 10, 10ª, 10ᵇ, and 11.) There are two similar type-forms, F, F, a right-hand one and a left-hand one. Both are cylindrical, and have the characters arranged around them in parallel peripheral rows. Each type-form is provided with a shaft, F', the type-form and shaft being firmly attached to each other, so that they move together. The type-form shafts, F', F', lie parallel with each other. Each of them is provided with a sleeve, $F^2$.

The type-form shafts are free to slip up and down in their sleeves, but cannot revolve, except as the sleeves revolve. To this end the shafts are made square or hexagonal in cross section. The sleeves, $F^2$, $F^2$, are furnished, at their lower ends, with teeth, the toothed parts being marked, $F^3$, $F^3$. The type-form shaft-sleeves, $F^2$, $F^2$, are mounted in type-form shaft-sleeve bearings, $F^4$, $F^4$, so as to be free to rotate therein. Each of said sleeves, $F^2$, $F^2$, is held in place in its bearings, $F^4$, by means of the toothed part, $F^3$, below the bearing, and a collar, $F^5$, attached to the sleeve, $F^2$, above the bearing, $F^4$, by a set screw. The type-form-shaft-sleeve bearings are mounted on shafts, $F^6$, $F^6$, the type-form-shaft-sleeve bearings, $F^4$, $F^4$, being firmly attached to the respective shafts, $F^6$, $F^6$, so as to move therewith. The type-form-shaft-sleeve-bearing-shafts, $F^6$, $F^6$, are mounted in line with each other in the casting, $A^{45}$, before mentioned. The rock-shaft, D, lies parallel with the shafts, $F^6$, $F^6$, and immediately under them. The casting $A^{45}$, forms a bearing for said shaft, at one end, and its other end is supported by the upright, $A^7$. Two toothed segments, $D^2$, $D^2$, suitably attached to the rock-shaft, D, (as for instance by set screws,) so as to move therewith, gear respectively with the toothed sleeves, $F^2$, $F^2$, so that whenever the rock-shaft, D, is rotated, or moved angularly, it imparts a similar motion to the type-form-shaft-sleeves, $F^2$, $F^2$, type-form-shafts, $F'$, $F'$, and type-forms, F, F. The rock-shaft, E, is mounted between steel trunnions or centers, like the rock-shafts, $g'$, $g^2$, $g^4$ and $g^8$, $h^2$, $h^4$ and $h^8$. Said rock-shaft, E, has attached to it, so as to move with it, besides the arm, $E'$, before mentioned, two longer arms, $E^2$, $E^2$, exactly similar to each other, and both standing, preferably, at a right angle to the arm, $E'$. One of the aforesaid arms, $E^2$, $E^2$, is connected with the right-hand type-form; the other, with the left-hand type-form. Each of said type-form shafts, has a pair of fast collars, $F^7$ and $F^8$, attached to it, with a loose collar, $F^9$, between them. The loose collar is connected by a pair of shoulder screws $F^{22}$, $F^{23}$, set fast in the loose collar with one end of the link, $E^3$, whose other end is connected with the arm, $E^2$, of the rock-shaft, E. It will be seen that whenever said rock-shaft is rocked, or made to move angularly, on its axis, its arms, $E^2$, $E^2$, move the links, $E^3$, $E^3$, type-form shafts, $F'$, $F'$, and type-forms F, F, up or down.

I have before said that the keys $d'$, $d^2$, $d^4$, $d^8$, $e^2$, $e^4$, and $e^8$, serve to rotate the type-forms, while the keys $q'$, $q^2$, $q^4$, $r'$, $r^2$ and $r^4$, serve to move them up and down—to reciprocate them. I have also said that the keys, $d'$, $d^2$, $d^4$, and $d^8$ serve to move the type-forms around in the opposite direction from that in which they are moved by the keys, $e^2$, $e^4$ and $e^8$; and that the keys, $q'$, $q^2$ and $q^4$ serve to move the type-forms upward, while the keys $r'$, $r^2$ and $r^4$ serve to move them downward. The most superficial observation will disclose the fact that the type-form rotating keys ($d'$, $d^2$, $d^4$, $d^8$, $e^2$, $e^4$ and $e^8$,) give the type-forms their proper rotary motions whether any of the type-form reciprocating keys are acting upon the type-forms or not; and *e converso*, that the type-form reciprocating keys ($q'$, $q^2$, $q^4$, $r'$, $r^2$, and $r^4$,) give the type-forms their proper up and down motions whether any of the type-form rotating keys are acting upon the type-forms or not. It is also true that each of the type-form rotating keys effects its own movement of the type-forms whether any other type-form rotating key is acting or not, so that when two or more type-form rotating keys are acted upon by the operator at the same time, the movement of the type-forms effected by their joint action is substantially equal to the algebraic sum of the movements which each, acting singly, would give the type-forms, and the same is true of the type-form reciprocating keys. I shall now endeavor to make this clear from the drawings, and as the arrangement of rock-shafts, arms and links for each key, is substantially similar to that of the other keys, a description of a few will suffice for all.

It has already been made clear that the keys $d'$, $d^2$, $d^4$, $d^8$, $e^2$, $e^4$, $e^8$, $q'$, $q^2$, $q^4$, $r'$, $r^2$, and $r^4$, respectively, when depressed, rock their respective rock-shafts, $g'$, $g^2$, $g^4$, $g^8$, $h^2$, $h^4$, $h^8$, $s'$, $s^2$, $s^4$, $t'$, $t^2$ and $t^4$. The motion of the rock-shafts $g'$, $g^2$, $g^4$, $g^8$, $h^2$, $h^4$ and $h^8$, when impelled by their respective keys is against watch hands, as viewed in Fig. 14; that of the rock-shafts $s'$, $s^2$, $s^4$, $t'$, $t^2$ and $t^4$ is with watch hands, as viewed in Fig. 15. The motion of the rock-shafts $g'$, $g^2$, $g^4$, $g^8$, $h^2$, $h^4$ and $h^8$, is arrested by their respective arms $k'$, $k^2$, $k^4$, $k^8$, $l^2$, $l^4$ and $l^8$, coming in contact with the stops $A^{29}$, $A^{29}$, &c. In like manner the motion of the rock-shafts $s'$, $s^2$, $s^4$, $t'$, $t^2$ and $t^4$, respectively, is arrested by their respective arms $u'$, $u^2$, $u^4$, $v'$, $v^2$ and $v^4$, coming in contact with the stops $A^{33}$, $A^{33}$, &c. Each of the rock-shaft arms $k'$, $k^2$, $k^4$, $k^8$, $l^2$, $l^4$, $l^8$, $u'$, $u^2$, $u^4$, $v'$, $v^2$ and $v^4$, respectively, lies normally in line with its link $m'$, $m^2$, $m^4$, $m^8$, $n^2$, $n^4$, $n^8$, $w'$, $w^2$, $w^4$, $x'$, $x^2$ and $x^4$, respectively; and the action of the key in each case consists in moving the rock-shaft arm and link connected therewith from their normal position of alignment with each other, shortening the distance between their extreme ends, and moving the lever with which the link is connected, by the amount of this shortening. So much in general. To descend to particulars, when the key $d'$ is depressed, it acts through its push-up $i$, upon the arm $j$, of its rock-shaft $g'$, rocking said shaft until its arm $k'$ comes in contact with, and is arrested by, the stop $A^{29}$. The arm $k'$ and link $m'$, when thus moved from their normal position of alignment with each other, draw the end of the lever $m^3$, with which said link $m'$ is connected, toward them. Said lever $m^3$ swings on its point of connection with the link $m^2$, as a fulcrum, and through the link $o$, moves the lever $p$, which swings on its point of connection with the link $o'$, as a fulcrum, and moves the lever $p'$. Said lever $p'$ swings on its center of connection with the link $o^2$, as a fulcrum, and moves the lever $p^2$, which in turn moves on its center of connection with the link $n^3$, as a fulcrum, and through the link $o^3$, lever $p^3$, and link $o^4$, moves the rock-shaft arm $D'$, rock-shaft $D$, and segmental toothed arms $D^2$, $D^2$, connected fast therewith. These segmental toothed arms $D^2$, $D^2$, mesh with the geared parts $F^3$, $F^3$, of the type-form shaft sleeves $F^2$, $F^2$, rotating said sleeves $F^2$, $F^2$, and the type-form shafts $F'$, $F'$, and the type-forms $F$, $F$—the last named parts through one letter space. When the rock-shaft arm $k^2$, and link $m^2$, are moved from their normal positions of alignment by the action of the key $d^2$, and rock-shaft $g^2$, said arm $k^2$ and link $m^2$, in like manner, draw the end of the lever $m^3$, with which the link $m^3$ is connected, toward them, which lever $m^3$, now swinging on its point of connection with the link $m'$, as a fulcrum, moves the link $o$, lever $p$ and type-forms $F$, $F$, in the manner described—the type-forms $F$, $F$, being now moved through two letter spaces, and if the keys $d'$ and $d^2$ are acted upon by the operator simultaneously, the arm $k'$ and link $m'$ move from their normal position of alignment and draw the upper end of the lever $m^3$ toward them, as before; and the arm $k^2$ and link $m^2$, in like manner, move from their normal position of alignment with each other, and draw the lower end of the lever $m^3$ toward them, exactly as before. The link $o$ is moved at once by the joint action of the couples, $k'$, $m'$, and $k^2$, $m^2$, through a distance equal to the sum of the distances through which said couples, acting singly would move it, and the link $o$ as before, moves the lever $p$ and the type-forms $F$, $F$—the latter through three letter spaces. The action of the rock-shaft arms $l^2$ and $l^4$ (when moved by the corresponding keys $e^2$ and $e^4$,) upon their respective links $n^2$ and $n^4$ and the lever $n^6$ and link $o'$ connected therewith, is in all respects exactly similar to that of the rock-shafts $g'$, $g^2$, and connections upon the lever $m^3$ and link $o$; but the link $o'$ is so connected with the lever $p$ that that lever swings, when moved by said link $o'$, upon its (said lever's) point of connection with the link $o$ as a fulcrum. The lever $p$, under the influence of the keys $e^2$ and $e^4$ and link $o'$, thus moves in the opposite direction to that in which it moved under the influence of the keys $d'$ and $d^2$ and link $o$. The key $e^2$, (acting through the rock-shaft $h^2$, arm $l^2$, link $n^2$, lever $n^6$, link $o'$, lever $p$ and other intermediate parts,) moves the type-forms through two letter spaces negatively (the words positive and negative being used in this specification merely as terms of opposition.) The key $e^4$ (acting through its rock-shaft $h^4$, arm $l^4$, link $n^4$ and other interposed parts) moves the type-forms through four letter spaces negatively. Together they move the type-forms through six letter spaces negatively. Either or both of the keys $d'$ and $d^2$ may be made to act simultaneously with either or both of the keys $e^2$ and $e^4$. In fact, the key $d'$ is intended to act at times conjointly with the key $e^2$, at other times with the key $e^4$, and in some cases with both $e^2$ and $e^4$. The keys $d'$ and $e^2$, acting together, effect a motion of the type-forms through one letter space, negatively. $d'$ and $e^4$, acting together, effect a motion of the type-forms through three letter spaces, negatively; and $d'$ $e^2$ and $e^4$, acting together, effect a motion of the type-forms through five letter spaces, negatively; and when the links $o$ and $o'$ are thus made to act upon the lever $p$ simultaneously, the motion which one of said links gives said lever is superposed upon, or algebraically added to, that which the other of said links gives said lever. Under the influence of the link $o$, the lever $p$ moves upon its point of connection with the link $o'$ as a fulcrum, and under the influence of said link $o'$, said lever $p$ swings upon its point of connection with the link $o$, as a fulcrum. The action of the rock-arms $k^4$ and $k^8$ upon their respective links $m^4$ and $m^8$ and upon the lever $m^{12}$, with which said links are connected, and upon the link $o^2$, connected with said lever $m^{12}$, is in all respects exactly similar to the action of the rock arms $k'$ and $k^2$, and $l^2$ and $l^4$ upon their respective links $k'$ and $k^2$, and $l^2$ and $l^4$, levers $m^3$ and $n^6$, and links $o$ and $o'$. When moved by either or both of the keys $d^4$, $d^8$, (through the intervention of the rock-shafts, $g^4$, $g^8$, rock-shaft arms $k^4$, $k^8$, links $m^4$, $m^8$, and lever $m^{12}$,) the link $o^2$ moves the lever $p'$, which swings on its point of connection with the lever $p$, as a fulcrum, and through the lever $p^2$, link $o^3$, lever $p^3$, link $o^4$, rock-shaft arm $D'$, rock-shaft $D$, segmental toothed arms, $D^2$, $D^2$, type-form shaft sleeves $F^2$, $F^2$, and type-form shafts $F'$, $F'$ rotates the type forms $F$, $F$ through four letter spaces, if the key $d^4$ act alone, through eight letter spaces, if the key $d^8$ act alone, through twelve letter spaces if the keys $d^4$ and $d^8$ act together; and the direction of the motion thus imparted to the type-forms by the action of the keys $d^4$ and $d^8$, is positive, that is to say, it is similar to that imparted by the keys $d'$ $d^2$ and opposite to that imparted by the keys $e^2$ $e^4$ and $e^8$. Either or both of the keys $d'$, $d^2$, may be acted upon simultaneously with either or both of the keys $d^4$, $d^8$, to give a joint or combined motion to the type-forms. The rock-shaft arm $l^8$, (which corresponds to, and is operated by, the key $e^8$, through the rock-shaft $h^8$,) is connected by its link $n^8$ with the lever $p^2$, so that when said rock-shaft arm $l^8$ and link $n^8$ are moved from their normal position of alignment, by the action of the key $e^8$, they draw the lever $p^2$ toward them, which lever, swinging on its center of connection with the lever $p'$, as a fulcrum, moves the link $o^3$, lever $p^3$, link $o^4$, rock-shaft arm $D'$, rock-shaft $D$, segmental toothed arms $D^2$, $D^2$, type-form shaft sleeves, $F^2$, $F^2$, type-form shafts, $F'$, $F'$, and type-forms F, F, the latter negatively, through eight letter spaces, and the rock-shaft arm, $l^8$, like all the others, conveys its own motion to the type-forms, whether any other is acting or not, so that when two or more of said arms act simultaneously, they effect a movement of the type-forms equal to the algebraic sum of the movements which each of the rock-shafts would effect, if acting by itself alone. The action of the arms, $v'$, $v^2$, $u^4$, $u^2$, (impelled by the keys $r'$, $r^2$, $q^4$ and $q^2$,) upon their respective links $x'$, $x^2$, $w^4$ and $w^2$, levers $x^3$ and $w^6$, links $y$ and $y'$, and lever $z$, Fig. 15, is exactly similar in all respects to the action of the arms $k'$, $k^2$, $l^4$ and $l^2$, (impelled by the keys $d'$, $d^2$, $e^4$, and $e^2$,) upon their respective links $m'$, $m^2$, $n^4$ and $n^2$, levers $m^3$ and $n^6$, links $o$ and $o'$, and lever $p$, Fig. 14, which has been already described. The lever $z$, when thus moved by the action of any one or more of the keys $q'$, $q^2$, $r^2$, $r^4$, moves the lever $z'$, which, swinging on its point of connection with the link $y^2$, as a fulcrum, moves the link $y^3$, rock-shaft arm $E'$, rock-shaft, E, rock-shaft arms $E^2$, $E^2$, links $E^3$, $E^3$, type-form shafts $F'$, $F'$, and type-forms F, F. The action of the key $r'$, rock-shaft $t'$, rock arm $v'$, link $x'$, and other intermediate parts serves to move the type-forms downward one letter space. The key $r^2$, rock-shaft $t^2$, arm $x^2$, and intermediate parts, serve to move the type-forms downward two letter spaces. The conjoint action of the keys $r'$, $r^2$, and connections serves to move the type-forms downward three letter spaces. The action of the key $q^2$, rock-shaft $s^2$, rock arm $u^2$, link $w^2$, and intermediate parts, serves to move the type-forms upward two letter spaces. The action of the key $q^4$, rock-shaft $s^4$, rock-arm $u^4$, link $w^4$, and intermediate parts, serves to move the type-forms upward four letter spaces. The conjoint action of the keys $q^2$, $q^4$, and connections, serves to move the type-forms upward six letter spaces.

The rock-arm $u'$, and link $w'$, when moved from their normal positions by the action of the key $q'$, move the lever $x^5$, which, swinging on its point of connection with the link $x^4$, as a fulcrum, moves the link $y^2$, lever $z'$, link $y^3$, rock-arm $E'$, rock-shaft E, rock-arms $E^2$, $E^2$, links $E^3$, $E^3$, type-form shafts $F'$, $F'$, and type-forms F, F—raising the parts last named one letter space. The rock-arm $v^4$ and link $x^4$, when moved from their normal positions by the action of the key $r^4$, move the lever $x^5$, which, swinging on its point of connection with the link $w'$, as a fulcrum moves the link $y^2$, lever $z'$, and type-forms F, F— the parts last named downward through four letter spaces.

I have spoken of the movement synthesizer transmitting to the type-form, when two or more of the same movement synthesizer's elements act simultaneously, a movement equal or substantially equal to the algebraic sum of the movements produced by such individual elements acting singly. On account of the changes in the angular positions of the various levers, ($m^3$, $n^6$, $m^{12}$, $p$, $p'$, and $p^2$ of the type-form rotating movement synthesizer, and $x^3$, $w^6$, $x^5$, $z$ and $z'$ of the type-form reciprocating movement synthesizer,) the movements transmitted to the type-form when several of the rock-shafts act together, are not absolutely equal, if measured in inches or millimeters, to the algebraic sum of the movements produced by such rock-shafts acting singly. By lengthening the levers $m^3$, $n^6$, $m^{12}$, $p$, $p'$, $p^2$ and $p^3$, however, with reference to the rock-shaft arm, $D'$, and by lengthening the levers, $x^3$, $w^6$, $x^5$, $z$ and $z'$, with reference to the rock-shaft arm, $E'$,—in other words, by decreasing the angular movements of the levers—the approximation to exact equality may be made very close; but it is not essential that there be a very exact approximation; for the characters can be and should be so placed upon the type-form as to compensate for the inequalities. The proper course is to ascertain the exact position to which the type-form is moved by each key and combination of keys, and then to place the row of type corresponding to such key or combination of keys upon that portion of the type-form which is brought in front of the printing-point by such key or combination of keys. To state the matter more in detail, the stop for the rock-arm, $u'$, should be so set that when said arm is moved by its key, $q'$, it will raise the type-form exactly one letter-space. The stop for the arm, $u^2$, should be so set that said arm, when moved by its key, $q^2$, will move the type-form upward exactly two letter spaces; and the stop for the arm, $u^4$, should be so set that said arm when moved by its key, $q^4$, will move the type form upward exactly four letter-spaces; and in like manner the stops for the arms, $v'$, $v^2$ and $v^4$, should be so set respectively that said arms when moved by their respective keys, $r'$, $r^2$ and $r^4$, will move the type-form downward exactly one letter-space, two letter-spaces and four letter-spaces, respectively. The type-form should now be marked in its normal position at a point exactly on the level of the printing-point or printing line of the carriage. It would then be moved upward one letter-space by the key $q'$ and marked in that position. It should then be moved upward two letter-spaces by the key, $q^2$, and marked in that position. It should then be moved upward three letter-spaces by the simultaneous action of the keys, $q'$ and $q^2$, and marked in that position. It should then be moved upward four letter-spaces by the key, $q^4$, and be marked in that position. It should then be moved upward five letter-spaces by the simultaneous action of the keys, $q'$ and $q^4$, and be marked in that position. It should then be moved upward six letter-spaces by the simultaneous action of the keys, $q^2$ and $q^4$, and be marked in that position. It should then be moved upward seven letter-spaces by the simultaneous action of the keys, $q'$, $q^2$ and $q^4$, and be marked in that position. It should then be moved downward one letter-space by the action of the key, $r'$, and be marked in that position. It should then be moved downward two letter-spaces by the action of the key, $r^2$, and marked in that position. It should then be moved downward three letter-spaces by the simultaneous action of the keys, $r'$ and $r^2$, and be marked in that position. It should then be moved downward four letter-spaces by the action of the key, $r^4$, and be marked in that position. It should then be moved downward five letter-spaces by the simultaneous action of the keys, $r'$ and $r^4$, and be marked in that position. It should then be moved downward six letter-spaces by the simultaneous action of the keys, $r^2$ and $r^4$, and be marked in that position; and finally it should be moved downward seven letter-spaces by the simultaneous action of the keys, $r'$, $r^2$ and $r^4$, and be marked in that position. The various circumferential rows of characters should be placed on the levels of these different marks. The circumferential rows will not be exactly equidistant, measured in inches or millimeters, but the alignment will be perfect. The magnitude of the various letter-spaces, that is, the distances from row to row, will vary slightly, measured in inches or millimeters, and the movement given to the type-form by a plurality of keys acting simultaneously will not be exactly equal, measured in inches or millimeters, to the algebraic sum of the individual movements of the type-form belonging to such keys; but the movement given to the type-form, counted in letter-spaces or rows of type on the type-form, (which is the important point,) will always be exactly equal to the algebraic sum of the movements of the various keys acting; and the alignment will be correct. The distances between the various vertical rows of characters should be determined in a like manner, the stops for the type-form-rotating movement synthesizer being so set that the arms $k'$, $k^2$, $k^4$ and $k^8$, will rotate the type-form exactly one, two, four and eight letter-spaces respectively, in the one direction, while the arms, $l^2$, $l^4$, and $l^8$ rotate it exactly two, four and eight letter-spaces respectively in the opposite direction; the type-form being itself rotated into each of its various angular positions by the proper key or combination of keys, marked in such positions, and the vertical rows placed upon these marks.

When a perfect pattern type-form is once made in the manner described, and exact copies made from it, it will only be necessary to adjust the stops for the various arms $k'$, $k^2$, $k^4$, $k^8$, $l^2$, $l^4$, $l^8$, $u'$, $u^2$, $u^4$, $v'$, $v^2$ and $v^4$. The combinations will always come out right when the simple elements are correctly adjusted, if the type-form be made exactly like the pattern type-form.

The general arrangement of characters on one of the type-forms is illustrated in the following diagram.

|   |   | L | Q | D | K | I | G | U | X | A | M | O | P |   | H | N | B | T | F | R | J | E | C | Y | V | S | W | Z |
|---|---|---|---|---|---|---|---|---|---|---|---|---|---|---|---|---|---|---|---|---|---|---|---|---|---|---|---|---|
|   |   | ll | ql | dl | kl | il | gl | ul | xl | al | ml | ol | pl |   | hl | nl | bl | tl | fl | rl | jl | el | cl | yl | vl | sl | wl | zl |
|   |   | ld | qd | dd | kd | id | gd | ud | xd | ad | md | od | pd |   | hd | nd | bd | td | fd | rd | jd | ed | cd | yd | vd | sd | wd | zd |
|   |   | li | qi | di | ki | ii | gi | ui | xi | ai | mi | oi | pi |   | hi | ni | bi | ti | fi | ri | ji | ei | ci | yi | vi | si | wi | zi |
|   |   | lu | qu | du | ku | iu | gu | uu | xu | au | mu | ou | pu |   | hu | nu | bu | tu | fu | ru | ju | eu | cu | yu | vu | su | wu | zu |
|   |   | la | qa | da | ka | ia | ga | ua | xa | aa | ma | oa | pa |   | ha | na | ba | ta | fa | ra | ja | ea | ca | ya | va | sa | wa | za |
|   |   | lo | qo | do | ko | io | go | uo | xo | ao | mo | oo | po |   | ho | no | bo | to | fo | ro | jo | eo | co | yo | vo | so | wo | zo |
| . | , | l | q | d | k | i | g | u | x | a | m | o | p |   | h | n | b | t | f | r | j | e | c | y | v | s | w | z |
|   |   | ln | qn | dn | kn | in | gn | un | xn | an | mn | on | pn |   | hn | nn | bn | tn | fn | rn | jn | en | cn | yn | vn | sn | wn | zn |
|   |   | lt | qt | dt | kt | it | gt | ut | xt | at | mt | ot | pt |   | ht | nt | bt | tt | ft | rt | jt | et | ct | yt | vt | st | wt | zt |
|   |   | lr | qr | dr | kr | ir | gr | ur | xr | ar | mr | or | pr |   | hr | nr | br | tr | fr | rr | jr | er | cr | yr | vr | sr | wr | zr |
|   |   | le | qe | de | ke | ie | ge | ue | xe | ae | me | oe | pe |   | he | ne | be | te | fe | re | je | ee | ce | ye | ve | se | we | ze |
|   |   | ly | qy | dy | ky | iy | gy | uy | xy | ay | my | oy | py |   | hy | ny | by | ty | fy | ry | jy | ey | cy | yy | vy | sy | wy | zy |
| 's | ls | qs | ds | ks | is | gs | us | xs | as | ms | os | ps |   |   | hs | ns | bs | ts | fs | rs | js | es | cs | ys | vs | ss | ws | zs |
| . | , | ( | " | 's | ; | : | 1 | 2 | 3 | 4 | 5 |   |   |   | 6 | ng | 7 | 8 | 9 | 0 | - | ' | $ | ) | # | ? | & | — |

The type-forms revolve in opposite directions so that the characters on one side of the central blank space in the diagram, are on the opposite side on the other wheel, but the same distance from the central blank space. By sacrificing a little the symmetrical appearance of the machine, (that is, by placing the two segments, $D^2$, $D^2$, both on the same side of the gears $F^3$, $F^3$,) the type-forms may be rotated in the same direction and both type-forms made exactly as in the diagram. This will be easily understood.

The vertical length of the diagram represents the vertical length of the type-wheel. The width of the diagram from right to left, represents the circumference of the type-form reduced to a plane. The vertical blank space down the center of the diagram, represents that portion of the circumference of the type-form which lies normally immediately in front of the printing point. The horizontal row of small letters (including the apostrophe and comma), in the center of the diagram, represents that portion of the type-form, measured vertically, which lies normally on a level with the printing point. The right-hand printing keys bring these characters to the printing point as follows:

a is brought to the printing point by the action of the key $e^4$.

b is brought to the printing point by the action of the keys $d'$ and $d^2$.

c is brought to the printing point by the action of the keys $d'$ and $d^8$.

d is brought to the printing point by the action of the keys $e^2$ and $e^8$.

e is brought to the printing point by the action of the key $d^8$.

f is brought to the printing point by the action of the keys $d'$ and $d^4$.

g is brought to the printing point by the action of the keys $d'$ and $e^8$.

h is brought to the printing point by the action of the key $d'$.

i is brought to the printing point by the action of the key $e^8$.

j is brought to the printing point by the action of the keys $d'$, $d^2$ and $d^4$.

k is brought to the printing point by the action of the keys $d'$, $e^2$ and $e^8$.

l is brought to the printing point by the action of the keys $e^4$ and $e^8$.

m is brought to the printing point by the action of the keys $d'$ and $e^4$.

n is brought to the printing point by the action of the key $d^2$.

o is brought to the printing point by the action of the key $e^2$.

p is brought to the printing point by the action of the keys $d'$ and $e^2$.

q is brought to the printing point by the action of the keys $d'$, $e^4$ and $e^8$.

r is brought to the printing point by the action of the keys $d^2$ and $d^4$.

s is brought to the printing point by the action of the keys $d^4$ and $d^8$.

t is brought to the printing point by the action of the key $d^4$.

u is brought to the printing point by the action of the keys $e^2$ and $e^4$.

v is brought to the printing point by the action of the keys $d'$, $d^2$ and $d^8$.

w is brought to the printing point by the action of the keys $d'$, $d^4$ and $d^8$.

x is brought to the printing point by the action of the keys $d'$, $e^2$ and $e^4$.

y is brought to the printing point by the action of the keys $d^2$ and $d^8$.

z is brought to the printing point by the action of the keys $d^2$, $d^4$ and $d^8$.

. is brought to the printing point by the action of the keys $e^2$, $e^4$ and $e^8$.

, is brought to the printing point by the action of the keys $d'$, $e^2$, $e^4$ and $e^8$.

The keys are arranged in such a manner that those that have the most work to do—those that move the type-forms through the greatest distances—are operated by the strongest fingers. The most frequently occurring letters e, t, n, i, a, o and h, are produced by the action of a single key and single finger; and the readiest formed combinations are assigned to the other more frequently occurring letters.

The top row of characters on the type-form is in every way similar to the middle row before mentioned, except that it is formed of upper case letters.

To produce an upper case letter, the same right-hand key or keys are depressed, to rotate the type-form, as are required for the production of the same letter lower case, and the left-hand keys $r'$, $r^2$ and $r^4$ are depressed, to bring the upper case row on a level with the printing point.

The lowest row of characters on the typewheel consists of figures, punctuation marks and other similar characters. It also includes the compound characters ng and 's. This row of characters is brought on a level with the printing point by the action of the keys $q'$, $q^2$ and $q^4$, and each of the characters in said row is brought in front of the printing point by the action of the right-hand key or keys that bring the other characters in the same vertical row in front of the printing point. The remaining circumferential rows are composed of double or compound characters.

It will be seen that the characters in the different circumferential rows standing in the same vertical line with each other form transverse rows, each of which includes a lower case letter, the same letter upper case, a figure or other mark, and a plurality of double or compound characters each of which is formed of the same letter before mentioned, which may be properly called the primary or leading letter, and some other letter, which may properly be called an accompanying or auxiliary letter.

In the diagram the auxiliary letters are a, d, e, i, l, n, o, r, s, t, u and y—the most frequently occurring letters in the alphabet.

It will be seen that all the compound characters in a vertical row have the same primary or leading letter, while all the compound characters in any given circumferential row have the same auxiliary letter.

To bring a compound character to the printing point, the right-hand or printing keys rotate the type-form, in the manner already described, so as to bring the vertical row of characters containing the desired primary letter in front of the printing point. At the same time, the left-hand or auxiliary keys raise or lower the type-form, so as to bring before the printing point the compound character containing the desired second or auxiliary letter.

The printing of the leading or primary letter is determined by the leading or right-hand keys.

The printing of the auxiliary letter is determined by the left-hand or auxiliary keys.

The particular key or combination of keys necessary for the printing of different primary letters has been already set forth.

The auxiliary letters are determined by the left-hand keys as follows:

a is produced by the action of the key $r^2$.

d is produced by the action of the keys $r'$ and $r^4$.

e is produced by the action of the key $q^4$.

i is produced by the action of the key $r^4$.

l is produced by the action of the keys $r^2$ and $r^4$.

n is produced by the action of the key $q'$.

o is produced by the action of the key $r'$.

r is produced by the action of the keys $q'$ and $q^2$.

s is produced by the action of the keys $q^2$ and $q^4$.

t is produced by the action of the key $q^2$.

u is produced by the action of the keys $r'$ and $r^2$.

y is produced by the action of the keys $q'$ and $q^4$.

A glance at the drawings will make clear the fact that the keys $d^2$, $d^4$, $d^8$, $e^2$, $e^4$ and $e^8$, of the right-hand set correspond respectively with the keys $q'$, $q^2$, $q^4$, $r'$, $r^2$ and $r^4$, of the left-hand set, and are operated by the same fingers, the keys $d^4$ and $e^4$ being operated by the index finger of the right-hand, while the keys $q^2$ and $r^2$ are operated by the index finger of the left-hand; the keys $d^8$ and $e^8$ being alike operated by the middle finger (third of German fingering), of the right-hand, while the keys $q^4$ and $r^4$ are operated by the middle finger of the left-hand; the keys $d^2$ and $e^2$ being operated by the ring finger (third of American, fourth of German, fingering), of the right-hand, while the keys $q'$ and $r'$ are operated by the ring finger of the left-hand; and a comparison of the lists already given of the keys and combinations of keys employed in the production of the various primary and auxiliary letters will disclose the fact that each of the auxiliary letters is produced by the action of a finger or fingers of the left-hand, corresponding exactly to the fingers of the right-hand that produce the same letter as a primary letter. This arrangement is valuable only in that it simplifies the task of learning, and enables the operator to master the auxiliary letters at the same time that he learns the primary or leading letters.

The particular arrangement of the characters upon the type-form is of little or no consequence. Obviously it may be so varied that not one character will appear in the place it now occupies in the diagram, while the general plan is retained.

Instead of employing in general only the more frequently occurring letters as auxiliary letters, the type-form might be enlarged and all the letters used as auxiliary letters—each letter being combined with every other letter. This, however, would cause a great increase in the size of the type-form without very materially reducing the number of operations requisite for the production of a given amount of printed matter.

An examination of the diagram will disclose some combination characters of exceedingly infrequent occurrence.

The great advantage of arranging the parts in such manner that the same primary key or combination of primary keys always produces a certain leading letter, while the same auxiliary key or combination of auxiliary keys always produces that auxiliary letter, whatever the primary letter may be, is that the machine is easily learned—a matter of the last importance to a great many type writer operators. A strict adherence to the rule, however, is not necessary. Some departures may be made with advantage to even a slow person, and many may be made with advantage to intelligent professional operators.

The following diagram shows a few departures from the rule that may be made with advantage:

|   | L | Q | D | K | I | G | U | X | A | M | O | P | . | H | N | B | T | F | R | J | E | C | Y | V | S | W | Z |
|---|---|---|---|---|---|---|---|---|---|---|---|---|---|---|---|---|---|---|---|---|---|---|---|---|---|---|---|
| ok | uk | ll | ek | dl | kl | il | gh | ul | xl | al | ml | ol | ph | ak | hl | nl | bl | th | fl | rl | jl | el | ch | yl | vl | sh | wh | zl | ik |
| ox | ux | ld | ex | dd | kd | id | gd | ud | xd | ad | md | od | pd | ax | hd | nd | bd | td | fd | rd | jd | ed | cd | yd | vd | sd | wd | zd | ix |
| og | ug | li | eg | di | ki | ii | gi | ui | xi | ai | mi | oi | pi | ag | hi | ni | bi | ti | fi | ri | ji | ei | ci | yi | vi | si | wi | zi | ig |
| oz | uz | lu | qu | du | ku | iu | gu | uu | xu | au | mu | ou | pu | az | hu | nu | bu | tu | fu | ru | ju | eu | cu | yu | vu | su | wu | zu | iz |
| om | um | la | em | da | ka | ia | ga | ua | xa | aa | ma | oa | pa | am | ha | na | ba | ta | fa | ra | ja | ea | ca | ya | va | sa | wa | za | im |
| op | up | lo | ep | do | ko | io | go | uo | xo | ao | mo | oo | po | ap | ho | no | bo | to | fo | ro | jo | eo | co | yo | vo | so | wo | zo | ip |
|   | , | l | q | d | k | i | g | u | x | a | m | o | p |   | h | n | b | t | f | r | j | e | c | y | v | s | w | z |
| ob | ub | ln | eb | dn | kn | in | gn | un | xn | an | mn | on | pn | ab | hn | nn | bn | tn | fn | rn | jn | en | cn | yn | vn | sn | wn | zn | ib |
| of | uf | lt | ef | dt | kt | it | gt | ut | xt | at | mt | ot | pt | af | ht | nt | bt | tt | ft | rt | jt | et | ct | yt | vt | st | wt | zt | if |
| oj | uj | lr | ej | dr | kr | ir | gr | ur | xr | ar | mr | or | pr | aj | hr | nr | br | tr | fr | rr | jr | er | cr | yr | vr | sr | wr | zr | ij |
| oc | uc | le | ec | de | ke | ie | ge | ue | xe | ae | me | oe | pe | ac | he | ne | be | te | fe | re | je | ee | ce | ye | ve | se | we | ze | ic |
| ov | uv | ly | ev | dy | ky | iy | gy | uy | xy | ay | my | oy | py | av | hy | ny | by | ty | fy | ry | jy | ey | cy | yy | vy | sy | wy | zy | iv |
| ow | uw | ls | ew | ds | ks | is | gs | us | xs | as | ms | os | ps | aw | hs | ns | bs | ts | fs | rs | js | es | cs | ys | vs | ss | ws | zs | iw |
|   | . | ( | " | 's | ; | : | 1 | 2 | 3 | 4 | 5 | / | . | 6 | ng | 7 | 8 | 9 | 0 | - |   | $ | ) | # | ? | & | — | % |

The general arrangement of the type-forms is the same. The primary letters are printed in the manner and by the keys already described. The auxiliary letters a, d, e, i, l, n, o, r, s, t, u and y, occupy the same positions on the type-form, and are produced by the same auxiliary keys or combinations of auxiliary keys as already described; but, for the infrequently occurring compound characters cd, gd, pd, sd, td, and wd, the more frequently occurring characters ch, gh, ph, sh, th and wh, are substituted, and there are five additional rows of double characters having the vowels a, e, i, o, u, respectively, for their primary letters, and the consonants b, c, f, g, j, k, m, p, v, w, x, and z, respectively, for their second or auxiliary characters.

b, as an auxiliary letter, is printed by the key $q'$.

c, as an auxiliary letter, is printed by the key $q^4$.

f, as an auxiliary letter, is printed by the key $q^2$.

g, as an auxiliary letter, is printed by the key $r^4$.

j, as an auxiliary letter, is printed by the keys $q'$ and $q^2$.

k, as an auxiliary letter, is printed by the keys $r^2$ and $r^4$.

m, as an auxiliary letter, is printed by the key $r^2$.

p, as an auxiliary letter, is printed by the key $r'$.

v, as an auxiliary letter, is printed by the keys $q'$ and $q^4$.

w, as an auxiliary letter, is printed by the keys $q^2$ and $q^4$.

x, as an auxiliary letter, is printed by the keys $r'$ and $r^4$.

z, as an auxiliary letter, is printed by the keys $r'$ and $r^2$.

a, as a primary letter followed by b, c, f, g, j, k, m, p, v, w, x, or z, is produced by the unaided action of the keys that produce its auxiliary letter; for this row of double characters lies in the center of the type-form, immediately in front of the printing point, so that no rotary movement of the type-forms and no action on the part of the right-hand keys is required.

e, as a primary letter followed by b, c, f, g, j, k, m, p, v, w, or x, is produced by the action of the keys $d'$, $e^4$ and $e^8$—the same keys that, when acting alone, (that is, without the coöperation of the left-hand set,) produce the letter q.

q in English is never followed by any letter but u, and its combination with other auxiliary letters would be superfluous.

qu, as appears in the diagram, is produced by the action of the keys that produce q as a primary letter and u as an auxiliary letter.

i, as a primary letter followed by b, c, f, g, j, k, m, p, v, w, x, or z, is produced by the action of the keys $d^2$, $d^4$ and $d^8$.

o, as a primary letter followed by b, c, f, g, j, k, m, p, v, w, x, or z, is produced by the action of the keys $e^2$, $e^4$ and $e^8$.

u, as a primary letter followed by b, c, f, g, j, k, m, p, v, w, x, or z, is produced by the action of the keys $d'$, $e^2$, $e^4$ and $e^8$.

The arrangement of characters last described and illustrated in the last diagram, is that which I prefer to use. It is sufficiently simple to be easily mastered by persons of ordinary ability; and by means of it the great majority of words containing an even number of letters can be written with half as many operations as there are letters, and almost any word containing an odd number of letters can be written with half as many operations as there are letters in the word plus one. The diagram first described is somewhat inferior in this respect, and has been shown for the sake of illustrating, in its most naked simplicity, the general plan of my type-form—not as the plan that I prefer to use.

Having now described the manner in which the various single characters and double letters are brought to the printing point, it remains to describe—

*The impression mechanism.*—(See particularly Figs. 1, 3, 4, 5 and 11.) There are two frames in the lower part of the machine lying over the printing keys—one for the right-hand keys, and one for the left-hand keys. Each frame consists of a bar G, shaft $G'$, and side pieces $G^2$, $G^2$, all firmly bound together. The shafts $G'$, $G'$, are supported by little castings, $G^3$, $G^3$, attached by machine screws to the key supporting rib $A'$. The bars, G, G, lie over the printing keys, so that when any printing key is acted on by the operator, it raises one of the bars G, G, and rocks the shaft $G'$ connected therewith.

$G^4$ is the impression lever. It is furnished with a trunnion $G^5$, which is supported by center screws $G^6$, $G^6$, set in the casting $A^{85}$, and held in place by check nuts $G^7$, $G^7$.

$G^8$, is a bar pin-jointed to the impression lever $G^4$.

$G^9$, $G^9$, are rock arms attached fast to the shafts $G'$, $G'$, and $G^{12}$, $G^{12}$, are machine screws or bolts set fast in said arms $G^9$, $G^9$, with their bodies or axial portions extending in close proximity to each other and almost meeting under the U-shaped bottom of the push-up $G^8$.

The parts are arranged in such a manner that when any of the printing keys ($d'$, $d^2$, $d^4$, $d^8$, $e^2$, $e^4$, $e^8$, $q'$, $q^2$, $q^4$, $r'$, $r^2$, $r^4$), is acted upon by the fingers, it raises the bar G and rocks the shaft $G'$ connected with such bar, raises the arm $G^9$, connected with said shaft, and, through the bolt $G^{12}$, set in the end of said arm, raises the push-up, $G^8$, and impression lever $G^4$. Said lever in rising, acts upon the rock-arms $F^{25}$, $F^{25}$, which are firmly attached in a suitable manner (as for instance, by set screws or by shrinking), to the type-forms' shaft sleeve bearing shafts, $F^6$, $F^6$, and throws the type-forms against the paper or inking ribbon. We have already seen how the character to be printed is selected by the printing keys through the movement synthesizers interposed between them and the type-forms.

*The spacing mechanism.*—(See particularly, Figs. 12, 12ª, 13, 13ª, and 13ᵇ.) $c^{37}$ is the space-rack before mentioned as attached to a swinging-frame, connected with the bottom-bar, $c'$, of the carriage-frame. The dog-carrying lever is formed of two parts, H and H′, connected together by machine screws, $H^2$ and $H^2$, the holes in the part, H, through which said screws $H^2$, pass being made elliptical or elongated to permit of the adjustment of the part, H, upon the part, H′, so as to bring the space-dogs hereinafter described closer together or farther apart, as desired; suitable washers being placed between the part, H′, and the heads of the screws, $H^2$. There are two space-dogs, a fast-dog and a loose-dog; the former being so called because it has no movement in the line of motion of the rack, $c^{37}$, and the latter being so termed because it has a movement in the same plane and tangent to the line of motion of the rack, $c^{37}$. Both dogs have an up-and-down movement. To this end, the fast dog, $H^3$, is connected with the part H, of the dog-carrying lever, by a little centerpin; and the loose-dog, $H^4$, is in like manner connected with the part, H′, of the aforesaid dog-carrying lever, by another little center pin. The fast-dog, $H^3$, is also connected by a center pin or pin-joint with a bridle-lever, $H^5$, lying substantially parallel with the dog-carrying lever. Said fast-dog, $H^3$, is also connected at its lower end, with a cross bar, $H^6$, that lies across the space keys, $f'$, $f^2$, $f'$, $f^2$, so that it is raised by any of said keys, when such key is acted upon by the performer. A similar cross-bar, $H^7$, lies back of the bar $H^6$, and parallel with it. Said bar $H^7$, lies across the space keys $f^2$, $f^2$, and across one of the arms $G^2$, of the left-hand space frame, so that when either of the keys $f^2$, $f^2$, is acted upon, and also when the left-hand space frame is raised by the action of any of the left-hand printing keys, ($q'$, $q^2$, $q^4$, $r'$, $r^2$, $r^4$,) one end of the cross bar $H^7$, is raised. Said bar $H^7$, lies across one of the space keys $f'$, but so far above said key that it is not moved by said key. Said cross-bar $H^7$, is pin-jointed, at its center, to a link, $H^8$. Said link is connected by center pins, or pin-joints with the parallel levers, $H^9$, and $H^{22}$. A lever $H^{23}$, is connected with the dog-carrying lever by means of a link, $H^{24}$, said link being pin-jointed to the parts H and $H^{23}$, respectively. The levers, H, $H^5$, $H^9$, $H^{22}$ and $H^{23}$, respectively, are provided with centers or trunnions, marked respectively, $H^{25}$, $H^{26}$, $H^{27}$, $H^{28}$ and $H^{29}$; and each of these trunnions is supported by center screws, $H^{32}$, $H^{32}$, said screws being provided with check-nuts for adjustment. Adjustable stops, $H^{33}$, $H^{34}$ and $H^{35}$, respectively, are attached to the levers, $H^5$, $H^9$ and $H^{23}$, respectively, by machine screws. To admit of adjustment, the holes in the stops, $H^{33}$, $H^{34}$ and $H^{35}$, through which the machine-screw last mentioned passes, are made elongated or elliptical; and washers are interposed between the heads of such screws and the stops, $H^{33}$, $H^{34}$ and $H^{35}$. The loose-dog $H^4$, is arrested by and rests against the stop, $H^{35}$, when the rack, $c^{37}$ rests against said dog. When said dog, $H^4$, is free from the rack, $c^{37}$, it (said dog) is arrested by the stop, $H^{34}$; but if the link, $H^8$, is elevated and the stop, $H^{34}$, moved down, then the loose-dog, $H^4$, moves on, under the influence of the spring, $H^{36}$, until it (said dog) is arrested by the stop, $H^{33}$.

By the main-spring arrangement hereinafter described, the carriage and the space-rack, $c^{37}$, are constantly urged in the direction shown by the arrow in Fig. 12ª. Normally the various parts occupy substantially the positions in which they are shown in Fig. 12ª. The rack rests in contact with the loose-dog, $H^4$, whose point is well up into the pitch of the rack. The fast-dog, $H^3$, lies with its point below a line tangent to the teeth of the rack, $c^{37}$, a less distance than the point of the loose-dog, $H^4$, is above such a line. The impression lever, $G^4$, lies immediately under the part, H. We have already seen that the aforesaid impression lever, $G^4$, is raised by the space bars, G, G, whenever any of the keys, $d'$, $d^2$, $d^4$, $d^3$, $e^2$, $e^4$, $e^8$, $q'$, $q^2$, $q^4$, $r'$, $r^2$, $r^4$, is acted on by the operator. Said impression lever, in rising, tilts the dog-carrying lever, thus drawing the loose-dog, $H^4$, down out of the rack, $c^{37}$, and pressing the fast-dog, $H^3$, up into it. The points of the dogs, $H^3$ and $H^4$, stand when the loose-dog, $H^4$, is pressed by the rack, $c^{37}$, against the stop, $H^{35}$, a certain number of rack-tooth spaces and a small fraction of a rack-tooth space apart, so that when the loose-dog, $H^4$, moves down away from the rack, $c^{37}$, said rack moves a short distance in the direction of the arrow, under the influence of the motor spring arrangement hereinafter described, until one of the teeth of said rack, $c^{37}$, comes in contact with the fast-dog, $H^3$, whereby the rack (and carriage connected therewith), are thereupon arrested. Meantime, the loose-dog, $H^4$, moves on, in the direction of the arrow, under the influence of the contractile spring, $H^{36}$, until said dog, $H^4$, is arrested by the stop, $H^{34}$, when the point of the dog, $H^4$, stands not quite one rack-tooth space to the left of its former position, in close proximity to the rack-tooth next to the left of the tooth with which it was last in contact. When the impression lever, $G^4$, returns to its normal position, the fast-dog, $H^3$, moves down out of the rack, and at the same time the loose-dog, $H^4$, moves up into it, and as soon as the fast-dog, $H^3$, clears the rack, said rack moves in the direction of the arrow, under the influence of the motor spring hereinafter described, until it is arrested by the loose-dog, $H^4$, which is pressed by the rack up against the stop, $H^{35}$.

When either of the keys, $f'$, $f'$, is acted on by the performer, it raises one end of the cross-bar, $H^6$, which acts as a lever of the second class and raises the fast-dog, $H^3$, thus moving the dog carrying lever in the direction of the arrow and drawing the loose-dog, $H^4$, down from the rack. When the space-key, $f'$ or $f'$, returns to its normal position, the dogs, $H^3$ and $H^4$, return to their normal positions; the operation of these parts in connection with each other and with the parts, $H^{34}$ and $H^{35}$, being the same, of course, as when moved by the impression lever, $G^4$, which has already been described.

When either of the keys, $f^2$, $f^2$, is acted on by the performer, it raises one end of the cross-bar, $H^6$, and thus moves the dog-carrying lever and the dogs, $H^3$ and $H^4$, in the manner just described. It also raises one end of the cross-bar, $H^7$, thus raising the link, $H^8$, moving the lever, $H^9$, and throwing the end of the stop, $H^{34}$, down below the end of the loose-dog $H^4$, so that said loose-dog, when it is moved by the contractile spring, $H^{36}$, after its (said loose dog's) point has been moved down below the teeth of the rack, moves on until it is arrested by the stop, $H^{33}$, and as the stop, $H^{34}$, is so adjusted that when the loose-dog is arrested by it, the point of said loose dog lies one-rack-tooth space to the left of the normal position, so in like manner, the stop, $H^{33}$, is adjusted in such a position that when the loose-dog is arrested by it, the point of said loose-dog lies two rack-tooth-spaces to the left of its normal position, so that when the dog-carrying lever returns to its normal position, the carriage moves two rack-tooth-spaces to the right (as viewed from behind).

When any of the left-hand printing keys are depressed, they raise the left-hand space bar G, thus raising the impression lever $G^4$, and causing the operations resulting from the raising of said lever, as already described. The left-hand space frame, at the same time, raises one end of the bar $H^7$, thus throwing down the stop $H^{34}$, and causing the carriage to move two spaces as already described.

It will thus be seen that the depressing of any of the right hand printing keys, or the depressing of either of the single-space keys, $f'$, $f'$, causes the carriage to move one letter space, while the depressing of any of the left-hand printing keys, or the depressing of either of the double-space keys $f^2$, $f^2$, causes the carriage to move two letter spaces. Thus space is provided for the double or compound characters. It is also rendered possible for the performer to make a letter and an inter-verbal space simultaneously, by depressing at the same time the key or keys that produce the letter and one of the double-space keys $f^2$, $f^2$.

*The carriage motor.*—(See particularly Figs. 2, 20, 21, 22, 23 and 24.) A sleeve, L, is journaled in the casting, $A^{75}$, before mentioned. A shaft, $L^2$, is journaled in this sleeve and in the nub $A^{68}$, of the casting, $A^{65}$. A ratchet-wheel, $L^3$, provided with a handle $L^4$, is formed integral with the sleeve L. A wheel, $L^5$, of the section shown, is firmly attached to the shaft, $L^2$, in like manner, by shrinking or otherwise. A belt or strap, $L^6$, connects the wheel, $L^5$, with the lower rail, $c'$, of the carriage; one end of said strap being connected with said rail and the other wound around the periphery of said wheel. A coiled spring, $L^7$, having its inner end attached to the sleeve, L, and its outer end attached to a pin $L^8$, driven into the wheel $L^5$, serves to urge the wheel, $L^5$, in the direction of the arrow, and thus to urge the carriage from right to left. A stop-pawl, or catch, $L^9$, serves to hold the ratchet-wheel, $L^3$, in any position that may be necessary to give the spring, $L^7$, the required tension.

*The ribbon arrangement.*—(See particularly Figs. 1, 2, 4, 8, 9, 10, 20, $20^a$, 22 and 23.) The inking arrangement herein described is similar to the inking arrangement illustrated in a prior application of mine before mentioned, Serial No. 431,869, filed May 5, 1892, (issued August 8, 1893, as Patent No. 502,700,) and in applications Nos. 446,990 and 446,991, of even date herewith. Said inking arrangement forms no part of the subject matter of the present application, and no special importance is attached to it. I have illustrated it herein so that an ordinary mechanic skilled in the art, may be enabled to practice my invention without having to contrive anything himself, some inking arrangement being indispensable to an operative machine, or at least to a highly useful one.

The inking ribbon is wound on two ribbon-spools, M, M. These spools are mounted respectively on shafts, $M'$, $M'$. The inwardly facing projections, $A^{57}$, $A^{57}$, $A^{57}$, $A^{57}$, &c., of the casting, $A^{55}$, form bearing for the ribbon-spool shafts, $M'$, $M'$. The ribbon passes also around (that is, turns an angle of ninety degrees on) little pulleys, $M^2$, $M^2$, which are mounted on shafts, $M^3$, $M^3$, which shafts are supported by the forwardly projecting arms, $A^{226}$, $A^{226}$, of the casting, $A^{225}$. Each of the shafts, $M'$, $M'$, has a collar, $M^5$, suitably attached to it, (as, for instance, by a set-screw,) immediately above the lower one of the projections, $A^{57}$, $A^{57}$, that forms a bearing for it (said shaft), and a miter-gear, $M^6$, in like manner attached to it immediately below the lower one of the said projections. In this manner, displacement of the ribbon-spool shafts, $M'$, $M'$, is prevented. $M^7$ is the horizontal ribbon spool driving shaft. The casting, $A^{55}$, and the lips, $A^{67}$, $A^{68}$, of the casting, $A^{65}$, form bearings for it, and it is movable longitudinally in the direction of its axis in said bearings, as well as rotatively mounted therein. A miter-wheel, $M^8$, lying between the lips, $A^{67}$ and $A^{68}$, of the casting, $A^{65}$, is loosely keyed to the shaft, $M^7$, in such a manner that the two rotate together, while the shaft, notwithstanding, is free to move somewhat in the direction of its axis, without moving the miter-wheel $M^8$. Said miter-wheel, $M^8$, meshes with the miter-wheel, $L^{22}$. Said miter, $L^{22}$, is formed at one end of a sleeve $L^{23}$, at the other end of which is an escapement wheel, $L^{24}$. This escapement, $L^{24}$, is formed as a part of the sleeve, $L^{23}$, and miter, $L^{22}$, before mentioned, and lies in close proximity to the flange, $L^{25}$, and is connected therewith by means of a detent, $L^{26}$, normally spring pressed against said escapement-wheel, $L^{24}$. The flange, $L^{25}$, (on which the detent, $L^{26}$, is centered,) is suitably attached to the shaft, $L^2$, (as, for instance, by a set-screw,) so that it moves therewith. The sleeve, $L^{23}$, on the contrary, and the miter wheel, $L^{22}$, and escapement-wheel, $L^{24}$, formed integral therewith, are mounted closely upon said shaft, $L^2$. The detent, $L^{26}$, before mentioned, connects the parts in such a manner that the escapement-wheel, $L^{24}$, sleeve, $L^{23}$, and miter, $L^{22}$, move with the flange, $L^{24}$, and shaft, $L^2$, when the wheel, $L^5$, mounted fast on said shaft, urges the carriage from right to left, (as viewed from in front,) but not when the carriage moves in the opposite direction. This movement of the escapement, $L^{24}$, sleeve, $L^{23}$, and miter, $L^{22}$, in turn moves the miter-wheel, $M^8$, and ribbon spool driving shaft, $M^7$. Two other miter-wheels, $M^9$, $M^9$, are firmly attached to this shaft in a suitable manner (as for instance, by set-screws). Said miter-wheels, $M^9$, $M^9$, are arranged to mesh respectively with the miter-wheels, $M^6$, $M^6$, attached to the ribbon spool shafts, $M'$, $M'$. The miters, $M^9$, $M^9$, however, are placed such a distance apart upon the ribbon spool driving shaft, $M^7$, that when the right-hand miter-wheels, $M^9$, and $M^6$, mesh with each other, the left-hand pair, $M^9$, $M^6$, are disengaged, and vice versa; and the before mentioned movement of the shaft, $M^7$, in the direction of its longitudinal axis, is for the purpose of bringing the miters $M^9$, $M^9$, carried by said shaft, $M^7$, alternately into engagement with the right-hand and left-hand ribbon spool shaft miters, $M^6$, $M^6$, so that the ribbon is first wound, (for instance,) from the right hand spool onto the left-hand spool, and then vice versa, and so on alternately.

The means provided for moving the shaft, $M^7$, longitudinally, and for locking it in its right-hand and left-hand positions, are the following:

$M^{22}$ is a handle and $M^{23}$ a collar, attached fast to the shaft, $M^7$.

$M^{24}$, is a lever, serving as a detent. Said lever is supported by, and fulcrumed upon, a shoulder screw, set fast in the arm, $A^{58}$, of the casting $A^{55}$. When said detent, $M^{24}$, is dropped down on the right-hand side of the collar, $M^{23}$, the right-hand pair of miters, $M^9$ and $M^6$, are held in mesh with each other; and so in like manner, when said detent, $M^{24}$, is dropped down on the left-hand side of the collar, $M^{23}$, the left-hand pair of miters, $M^9$ and $M^6$, are held in mesh with each other.

The mechanism shown for moving the type-forms into different positions, according to the keys or combinations of keys depressed, I call movement synthesizer mechanism, because by it a movement of the type-form is determined when a plurality of keys are depressed, equal to the algebraic sum of the movements which each of said keys would determine, if acting alone; so that the resultant movement of the type-form, when several keys act, may be considered in some sense as composed of, or synthesized out of, the several movements proper to the various keys acting; but when I speak in the statement of claim of a movement synthesizer, or of movement synthesizer mechanism, I do not wish to be understood as referring exclusively to the particular arrangement of movement synthesizer illustrated in the drawings.

Other forms of movement synthesizer are known. A number of such devices are described in my Letters Patent for improvements in type writing machines, dated August 8, 1893, No. 502,700, to the specification and drawings of which patent reference is hereby had and made for a fuller description of movement synthesizer mechanism.

Other forms of movement synthesizer than those described in this specification, or in the specification referred to, might doubtless be used; and I wish it to be distinctly understood that I do not restrict myself to any particular kind of movement synthesizer for the carrying out of my present invention.

Each of the movement synthesizers illustrated in the drawings serves to move the type-form in opposite directions from its normal position—sometimes in one direction and sometimes in the other. Such a movement synthesizer may be denominated a "positive and negative movement synthesizer," because some of its elements serve to move the type-form in one direction or positively, while its other elements serve to move it in the opposite direction or negatively—positive and negative being used in their ordinary sense as terms of opposition. Such a movement synthesizer may also be well termed a double acting movement synthesizer, because it acts to move the type-form both backward and forward—sometimes backward and sometimes forward—in bringing the characters to the printing point.

I consider positive and negative, or double acting, movement synthesizer mechanism as best adapted to such a machine as that herein described, because by means of it the average travel of the type-forms and the amount of force required to impel them are greatly reduced; but such a movement synthesizer is not indispensable. A movement synthesizer may be used whose elements all alike serve to move the type-form in the same direction. Several such devices are described in my before mentioned application. In the device as I have described it, the compound characters having the same primary letter form rows one way on the type-form, while those having the same auxiliary letter form rows the other way; and the type-form is moved in one arc or plane to bring the primary letter desired to the printing point and in another arc or plane to bring the desired auxiliary letter to the printing point. The primary keys move the type-form so as to bring to the printing point a row of double or compound characters having for their primary letter, the primary letter desired, and the auxiliary keys move the type-forms so as to bring to the printing point the compound character in the row before mentioned having for its secondary letter the auxiliary letter desired. This arrangement is convenient and simple, but it is by no means indispensable. I wish it to be distinctly understood that I do not limit myself to it. It may be greatly modified or altered without departing from the essential principle of my invention. Such alterations will modify or destroy the simple arrangement of rows of double or compound characters, having the same primary and different auxiliary letters, with transverse rows of double or compound characters, having the same auxiliary letter with different primary letters, so apparent in the diagram; but this is of no consequence, so long as the really important feature—the fact that the primary letter is determined by the primary key, and the auxiliary letter by the auxiliary keys, the fact that in general the same primary key or combination of primary keys that produces a certain letter alone, produces that letter whatever auxiliary letter may be produced by the auxiliary keys, and the fact that whatever auxiliary key or combination of auxiliary keys produces a certain auxiliary letter with one of the primary letters, (in general) produces that same auxiliary letter with any of the other primary letters—may still be retained.

It is of no consequence that the arrangement of double-letter characters in rows is altered so long as the essential thing, the type-form furnished with suitable groups (however disposed upon the type-form) of double-letter characters, suitably connected with the two sets of keys, is retained.

The equivalency of the various keys and combinations of keys of each set with the various primary and auxiliary letters having been ascertained, (by means of the tables hereinbefore given, or in any other manner,) and the movement synthesizer being constructed and arranged in such a manner, and connected with the primary and auxiliary keys in such a manner, that the primary keys do not interfere with the auxiliary keys, the designer of the type-form has only to ascertain what primary key or combination of primary keys, and what auxiliary key or combination of auxiliary keys, are concerned in moving a certain space on the type-form (large enough for a double or compound character), to the printing point, and then to place on that portion of the type-form, by such keys moved to the printing point, a double or compound character whose primary and auxiliary letters respectively are the letters for which the primary key or combination of primary keys and the auxiliary key or combination of auxiliary keys, concerned in moving that particular portion of the type-form to the printing point, stand.

Each of the type-forms shown is a cylinder; but it is not essential that the type-form be a cylinder or that it be one part. A great variety of type-forms are known in the art. Some consist of a cylinder, plate, segment, or other single part on which all the characters are formed. Others consist of a plurality of parts each having characters formed upon or attached to it, and all moving together and only together for the positioning of the characters, (but the several parts, in some cases, having independent movements for printing;) while still others consist of a plurality of parts each furnished with characters, all the parts having one movement or two movements together for the positioning of the type-form as a whole, and each of the parts having also a motion peculiar to itself for the positioning of its own characters, and in some cases having also an independent movement for printing them. A variety of these devices have been patented and some of them are in use. My invention might be carried out by means of them as well as by means of a type-form consisting of a single part disposed in the shape of a cylinder; and I wish it to be very distinctly understood that while my invention relates in a measure to the type-form, it relates to the furnishing of the type-form with suitable single characters and with suitable sets of compound or double-letter characters, to the arrangement of the characters in rows, and groups, &c., and not to the geometrical form or mechanical construction of the type-carrier employed—to the combination of suitable type-printing mechanism having certain single characters and certain sets or groups of compound or double-letter characters, with the keys or other controllers in a certain manner, &c., and not to the particular style of type-carrier employed in the combination. It is only essential that it be large enough to carry the necessary characters, and be conveniently movable to bring the characters to the printing point; and I wish it to be distinctly understood that I do not limit myself to any particular form, pattern or arrangement of type-form for the carrying out of my invention.

I have shown two type-forms arranged to print the same characters at different printing points simultaneously. In this way two copies may be made without carbon-paper. By lengthening the rock-shafts D and E and cylinder $c^8$, and providing one or more additional sets of the parts F, F′, $F^2$, $F^4$, $F^5$, $F^6$, $F^7$, $F^8$, $F^9$, &c., $D^2$, $E^2$ and $E^3$, for printing, and paper feeding devices $c^{23}$ or $c^{24}$, with hangers $c^{25}$, $c^{25}$, and pulleys $c^{27}$, $c^{27}$, $c^{28}$, $c^{28}$, $c^{29}$, $c^{29}$, with the bands $c^{32}$, $c^{32}$, &c., a large number of similar copies may be made simultaneously.

The arrangement of parts for printing two or more copies at two or more printing points simultaneously, may be much varied in many ways. This is pointed out more at length in another application of mine for Letters Patent for improvements in type writing machines, of even date herewith, Serial No. 446,991. The subject matter of said last mentioned application is mechanism for printing the same matter at different printing points simultaneously. Hence I do not claim such mechanism herein.

Spacing mechanism whereby two spaces are made when one or more of the auxiliary keys are depressed simultaneously with one or more of the primary keys, while but one space is made when the primary keys are depressed alone, is an important feature of my invention. This mechanism has been already clearly illustrated and described. The details of construction shown, however, may be much varied without departing from some of the essentials of my invention. This will be more easily made clear by a reference to the state of the art. In some devices for spacing, a dog or other part acts positively upon a toothed wheel or equivalent. In this case the magnitude of the movement of the dog or equivalent determines the magnitude of the space made, and the dog itself is the space determiner. Such a space arrangement is employed to move the inking ribbon in some well known writing machines, the Hammond and Caligraph for example; but in general an escapement mechanism is employed for moving the carriage. The details of construction are different in different machines, but they all have certain common underlying principles of construction, and are in certain essential particulars, equivalent escapements, each consisting essentially of a space determiner, a releaser, and a suitable toothed part connected with the carriage and coacting with the releaser to hold the carriage in place, after the space determiner has been released and left free to execute its own motion. The loose dog in machines having two dogs acting upon one rack, or the loose or free rack, in machines having one dog acting upon two racks, is the space determiner, the magnitude of whose movement, when moving in the opposite direction to that in which it is moved by the carriage, determines the magnitude of the next space to be made by the carriage. The fast dog, when there is a fast dog and a loose dog, or the dog, when there is but one dog, is the releaser. It serves in moving from its normal position to take the pressure of the carriage, releasing the space determiner from that pressure, and leaving it free to execute that motion of its, (the space determiner's,) upon which the magnitude of the space about to be made depends. In returning to its normal position, the releaser frees the carriage and leaves it free to move, until its movement is arrested by the space determiner. It will now be easily understood that the space dogs, instead of acting upon a rack, may be made to act upon a wheel or segment suitably connected with the carriage; that instead of employing a rack and two dogs, one of which has a motion with relation to the other, one dog and two racks, one of which latter has a motion with relation to the other, may be used instead, the loose rack serving as a space determiner, the equivalent of the loose dog, and that whether a loose dog or a loose rack, or some other part be used as a space determiner, is not essential, the important thing being that there be a suitable space determiner, and a suitable space enlarger, serving to increase, at times, the play of the space determiner, and connected with the keys in such a manner that the movement of the space determiner and of the carriage is greater when one or more of the auxiliary keys are depressed simultaneously with one or more of the primary keys than when the primary keys are depressed alone. It is more convenient, however, to connect the keys with a movable stop or space enlarger that acts upon a loose dog, than to connect them with a movable stop or space enlarger acting upon a loose rack carried by the carriage.

In the device herein described, all the right-hand keys are primary keys, and all the left-hand keys are auxiliary keys. I consider this advantageous, but it is not indispensable. It is obvious that this arrangement may be reversed, the primary keys being placed on the left-hand and the auxiliary keys on the right-hand; and while it is advantageous to arrange all the primary keys together and all the auxiliary keys together and to have each set operated by one of the hands, this is not indispensable. The primary and auxiliary keys may be arranged together in such a manner that the opetraing of them will be divided between the hands, each hand serving to operate one or more of the keys of both sets; and however in this respect the keys may be arranged, they can be conveniently connected with the movement synthesizers by the rock shafts at the back of the machine, said rock shafts being extended clear across the back so as to reach from the movement synthesizer to the keys, wherever placed.

I have illustrated herein mechanism for printing the same matter at different printing points simultaneously whereby a plurality of fac simile copies may be printed together. Such mechanism forms no part of my present invention and I do not claim it herein. It forms the subject matter of another application for Letters Patent of even date herewith, Serial No. 446,991.

What I do claim, and desire to secure by Letters Patent, is—

1. In a type-writer or other similar machine, a type-form furnished with a plurality of rows of characters, each row including a certain character standing by itself and a plurality of compound or double-letter characters formed by such letter with different other letters, the whole being arranged in such a manner that characters may be printed singly and also in pairs.

2. In a type-writer or other similar machine and in combination, a type-form suitably mounted and furnished with a plurality of rows of characters, each row including a certain character standing by itself and a plurality of compound or double-letter characters formed by such letter with different other letters, the whole being arranged in such a manner that characters may be printed singly and also in pairs; and suitable type-form positioning mechanism, whereby the various characters are brought into position for printing.

3. In a type-writer or other similar machine, a type-form furnished with a plurality of groups of compound or double-letter characters, each of said groups having in general some particular letters as a common or index letter of its various double-letter characters, different groups having different index-letters; said type-form being suitably mounted so that the various characters may be brought into position for printing and two letters printed simultaneously.

4. In a type-writer or other similar machine, and in combination, a type-form suitably mounted and furnished with a plurality of groups of compound or double-letter characters, each of said groups having in general some particular letter as the common or index letter of its various double-letter characters, different groups having different index-letters; keys and suitable type-form positioning mechanism intermediate the keys and the type-form, whereby the different characters are brought into position for printing.

5. In a type-writer or other similar machine, a type-form furnished with a plurality of groups of characters consisting in the main each of (a) a certain letter standing by itself and being the common or index letter of the group, and (b) a plurality of compound or double-letter characters formed by such index letter with different other letters, different groups having different index letters; said type-form being suitably mounted so that the various characters may be brought into position for printing, and letters printed singly or in pairs.

6. In a type-writer or other similar machine, and in combination, a type-form suitably mounted and furnished with a plurality of groups of characters consisting in the main each of (a) a certain letter standing alone and being the common or index letter of the group, and (b) a plurality of compound or double-letter characters formed by such index letter with different other letters, different groups having different index letters; keys and suitable type-form positioning mechanism intermediate the keys and the type-form, whereby the various characters are brought into position for printing.

7. In a type-writer or other similar machine, and in combination, type printing mechanism furnished with compound or double-letter characters for printing two letters simultaneously; two sets of simultaneously-acting controllers; and connections between the controllers and the type printing mechanism; the whole being arranged in such a manner that one set of controllers serves to determine one of the two letters to be printed simultaneously, the other set of controllers serving to determine the other of the two letters to be printed simultaneously.

8. In a type-writer or other similar machine, and in combination, type-printing mechanism furnished with compound or double-letter characters for printing two letters simultaneously; two sets of keys; and connections between the keys and the type-printing mechanism; the whole being arranged in such a manner that one set of keys serves to determine one of the two letters to be printed simultaneously, and the other set of keys to determine the other of the two letters to be printed simultaneously.

9. In a type-writer or other similar machine, and in combination, type printing mechanism furnished with single characters for printing letters one at a time and with compound or double letter characters for printing two letters simultaneously; a set of controllers suitably connected with the printing mechanism and serving to cause single characters to be printed; and a set of auxiliary controllers, also connected with the printing mechanism, and serving in conjunction with the controllers first named to cause two letters to be printed simultaneously.

10. In a type-writer or other similar machine, and in combination, type printing mechanism furnished with single characters for printing letters one at a time, and with compound or double-letter characters for printing two letters simultaneously; a set of keys connected with the printing mechanism and serving to cause single letters to be printed; and a set of auxiliary keys, also connected with the printing mechanism, and serving in conjunction with the keys first named to cause two letters to be printed simultaneously.

11. In a type writer or other similar machine, and in combination, a type-form furnished with double or compound characters for printing two letters simultaneously; two sets of controllers; and connections between the controllers and the type-form; one set of controllers serving to determine one of the two letters to be printed simultaneously, the other set of controllers serving to determine the other of the two letters to be printed simultaneously.

12. In a type writer or other similar machine, and in combination, a type-form furnished with compound or double-letter characters for printing two letters simultaneously; two sets of keys; and connections between the keys and the type-form; one set of keys serving to determine one of the two letters to be printed simultaneously, the other set of keys serving to determine the other of the two letters to be printed simultaneously.

13. In a type writer or other similar machine, and in combination, a type-form furnished with single characters for printing letters one at a time and with compound or double-letter characters for the printing of two letters simultaneously; a set of primary or leading keys, suitably connected with the type-form and serving to control its movements for the printing of single letters as before mentioned; and a set of auxiliary keys, serving in conjunction with the primary or leading keys before mentioned to bring the double-letter characters before mentioned to the printing point.

14. In a type writer or other similar machine and in combination, a type-form furnished with double or compound characters for printing two letters simultaneously, said type-form being movable in two different arcs or planes for bringing the characters to be printed to the printing point; a suitable movement synthesizer, serving to control the movements of the type-form in one of the arcs or planes before mentioned; and suitable type-form positioning mechanism arranged to control the movements of the type-form in the other of the arcs or planes before mentioned; primary keys serving to print single letters, and auxiliary keys serving, when acting in conjunction with the primary keys, to print double or compound characters.

15. In a type writer or other similar machine, and in combination, a type-form furnished with double or compound characters for printing two letters simultaneously, said type-form being movable in two different arcs or planes for the purpose of bringing the characters to be printed to the printing point; two movement synthesizers serving to control the movements of the type-form, one of the movement synthesizers being arranged to control the movements of the type-form in one of the arcs or planes before mentioned, and the other movement synthesizer being arranged to control the movements of the type-form in the other one of the arcs or planes before mentioned; primary keys serving to print single letters, and auxiliary keys serving, when acting in conjunction with the primary keys, to print double or compound characters.

16. In a type writer or other similar machine, and in combination, a type-form having double or compound characters for printing two letters at a time; a set of keys for the right-hand, suitably connected with the printing mechanism; a set of keys for the left-hand, also suitably connected with the printing mechanism, the two sets of keys serving conjointly to determine the two characters to be printed simultaneously, one set of keys serving to determine the first or leading character to be printed, the other set of keys serving to determine the second character to be printed at the same time with the leading character.

17. In a type writer or other similar machine, and in combination, printing mechanism serving to print characters one at a time, and also to print two characters simultaneously; two sets of printing keys, connected with the printing mechanism, each set serving when both sets acts simultaneously to determine one of the two letters to be printed simultaneously; a paper carriage; spacing mechanism for the paper carriage, said spacing mechanism including a suitable space determiner; a movable stop serving to determine the magnitude of the play of the said space determiner; and connections between one of the sets of keys before mentioned and the stop before mentioned; the parts being constructed, arranged and connected in such a manner that when the two sets of printing keys are acted upon simultaneously, the play of the space determiner and the consequent movement of the paper carriage is increased.

18. In a type writer or other similar machine, and in combination, a type-form furnished with single characters for printing letters one at a time, and with double or compound characters for printing two letters simultaneously; two sets of keys connected with the type-form and serving each to determine one of the two letters to be printed simultaneously; a paper carriage and spacing mechanism therefor connected with each of the sets of keys before mentioned, and serving to make a space for one letter, when but one set of keys acts for the printing of a single character, and to make a space for two letters when both sets of keys act simultaneously to print a double or compound character.

19. In a type writer or other similar machine and in combination, a type form furnished with single characters for printing letters one at a time, and with double or compound characters for printing two letters simultaneously; two sets of keys connected with the type-form and serving each to determine one of the two letters to be printed simultaneously; a paper carriage; spacing mechanism having a space enlarger, suitably connected with the keys of one set, so that when the keys of that set are acted upon, the space made by the carriage is increased.

20. In a type writer or other similar machine, and in combination, a type-form furnished with single characters for printing letters one at a time, and with double or compound characters for printing two letters simultaneously; two sets of keys connected with the type-form and serving each to determine one of the two letters to be printed simultaneously; a paper carriage; spacing mechanism for the paper carriage, said spacing mechanism including a suitable space determiner; a movable stop serving to determine the magnitude of the play of said space determiner; and connections between one of the sets of keys before mentioned and the stop before mentioned; the parts being constructed arranged and connected in such a manner that when the two sets of printing keys are acted upon simultaneously, the play of the space determiner and the consequent movement of the paper carriage is increased.

In testimony whereof I have hereunto set my hand, at Washington, in the District of Columbia, this 24th day of September, A. D. 1892.

THADDEUS CAHILL.

Witnesses:
ARTHUR T. CAHILL,
J. J. MALONE.